(12) United States Patent
Brown et al.

(10) Patent No.: US 10,077,579 B2
(45) Date of Patent: Sep. 18, 2018

(54) ROD HOLDER MOUNTING SYSTEM

(71) Applicant: Teak Isle Manufacturing, Inc., Ocoee, FL (US)

(72) Inventors: Patrick Brown, Longwood, FL (US); David Brown, Apopka, FL (US)

(73) Assignee: Teak Isle Manufacturing, Inc., Ocoee, FL (US)

( * ) Notice: Subject to any disclaimer, the term of this patent is extended or adjusted under 35 U.S.C. 154(b) by 252 days.

(21) Appl. No.: 14/062,576

(22) Filed: Oct. 24, 2013

(65) Prior Publication Data

US 2014/0110363 A1 Apr. 24, 2014

Related U.S. Application Data

(60) Provisional application No. 61/718,037, filed on Oct. 24, 2012.

(51) Int. Cl.
*E05B 65/00* (2006.01)
*A47F 7/00* (2006.01)
*A01K 97/08* (2006.01)

(52) U.S. Cl.
CPC .............. *E05B 65/00* (2013.01); *A01K 97/08* (2013.01); *A47F 7/0021* (2013.01); *Y10T 70/5009* (2015.04)

(58) Field of Classification Search
CPC ..... A01K 97/08; A01K 97/10; Y10S 224/922; B60R 5/006; B60R 7/08; B60R 9/00; B60R 9/06; B60R 9/08; A47B 81/005; E05B 65/00; A47F 7/0021; Y10T 70/5009

USPC .......... 211/70.8, 64, 68; 224/402, 403, 404, 224/405; 43/21.2; 410/116
See application file for complete search history.

(56) References Cited

U.S. PATENT DOCUMENTS

| | | | | |
|---|---|---|---|---|
| 3,524,572 A | * | 8/1970 | Hall | B60R 5/006 211/70.8 |
| 3,662,933 A | * | 5/1972 | Michal | B60R 9/08 224/315 |
| 5,560,576 A | * | 10/1996 | Cargill | B60P 7/15 224/331 |
| 5,979,102 A | * | 11/1999 | Sagryn | A01K 97/08 114/364 |
| 6,109,459 A | * | 8/2000 | Downey | A01K 97/08 211/70.8 |
| 6,796,078 B1 | * | 9/2004 | Bowman | A01K 97/10 211/70.8 |

(Continued)

*Primary Examiner* — Patrick D Hawn
(74) *Attorney, Agent, or Firm* — Seyfarth Shaw LLP

(57) ABSTRACT

A rod holder mounting system including first and second mounting bracket sub-assemblies adapted to couple to first and second opposing ends of a rod holder sub-assembly. The first and second mounting bracket sub-assemblies respectively couple to first and second opposing ones of a vehicle's existing tie down bracket coupling locations, existing tie down brackets, or a tool box, and the rod holder sub-assembly includes a cross bar with rod holder tubes and first and second locking systems adapted to removably couple the cross bar to the first and second mounting bracket sub-assemblies, respectively. The rod holder mounting system allows for the transportation of fishing rods and reels in a vehicle and locks both the rod holder sub-assembly to the vehicle and the rods and reels to the mounting system.

11 Claims, 27 Drawing Sheets

(56) References Cited

U.S. PATENT DOCUMENTS

| | | | | |
|---|---|---|---|---|
| 7,219,464 B1* | 5/2007 | Kujawa | A01K 97/08 211/70.8 |
| 7,661,223 B2* | 2/2010 | Dudney | A01K 97/08 206/315.11 |
| 7,877,922 B1* | 2/2011 | Petrie | A01K 97/08 206/315.11 |
| 8,746,469 B1* | 6/2014 | De La Torre | A01K 97/08 211/70.8 |
| 8,800,788 B1* | 8/2014 | Guidry | A01K 97/10 211/70.8 |
| 8,875,963 B2* | 11/2014 | Knutson | A01K 97/08 224/405 |
| 2003/0071098 A1* | 4/2003 | Martin | B60R 9/00 224/405 |
| 2004/0074940 A1* | 4/2004 | Aftanas | B60R 9/00 224/403 |
| 2004/0159690 A1* | 8/2004 | Hansen | B60P 3/122 224/403 |
| 2007/0169396 A1* | 7/2007 | O'Neill | A01K 97/08 43/21.2 |
| 2008/0314848 A1* | 12/2008 | Alley | A01K 97/08 211/70.8 |
| 2011/0179692 A1* | 7/2011 | McKnight | A01K 97/08 43/21.2 |
| 2011/0204109 A1* | 8/2011 | Knutson | A01K 97/08 224/405 |
| 2013/0026202 A1* | 1/2013 | Williams | B60R 9/06 224/405 |
| 2014/0263113 A1* | 9/2014 | Hall, II | A47B 81/005 211/70.8 |
| 2015/0060378 A1* | 3/2015 | Bestor | A47B 81/005 211/70.8 |

* cited by examiner

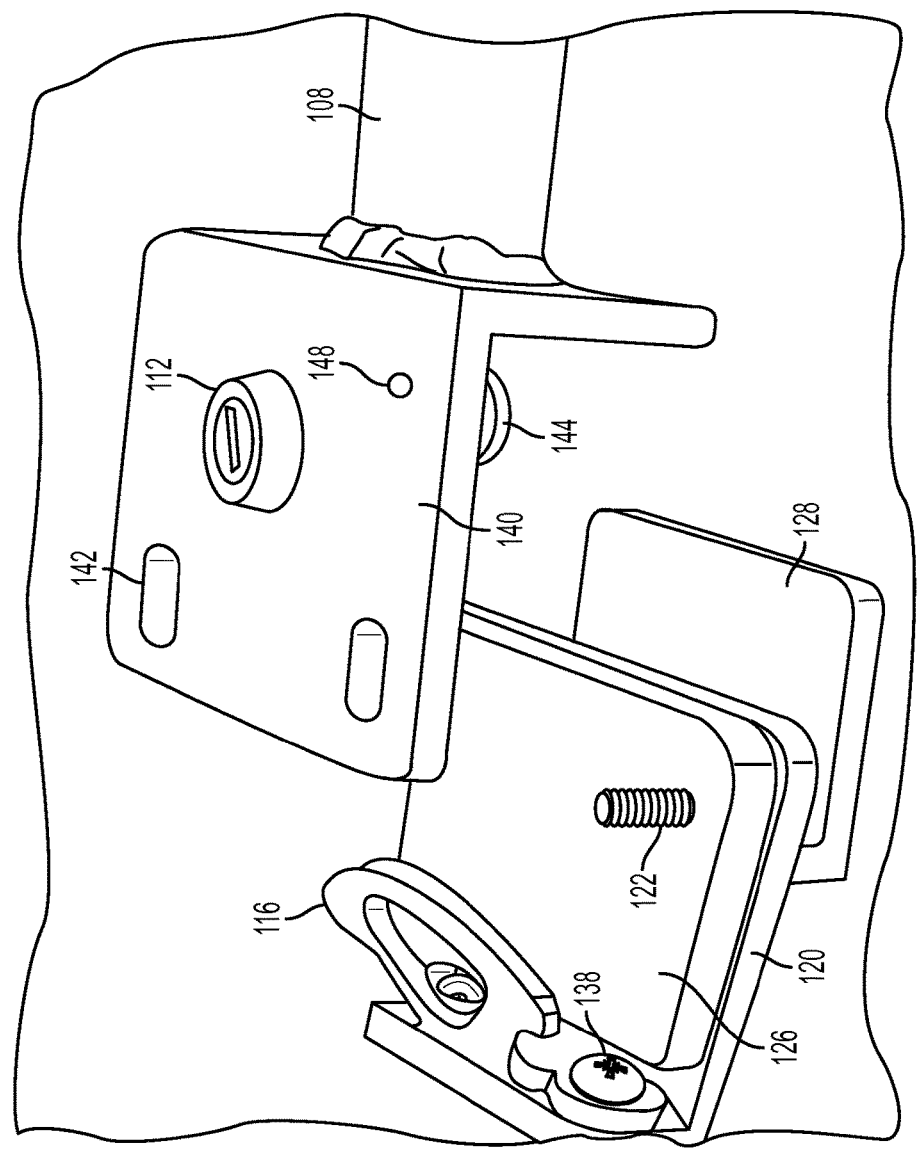

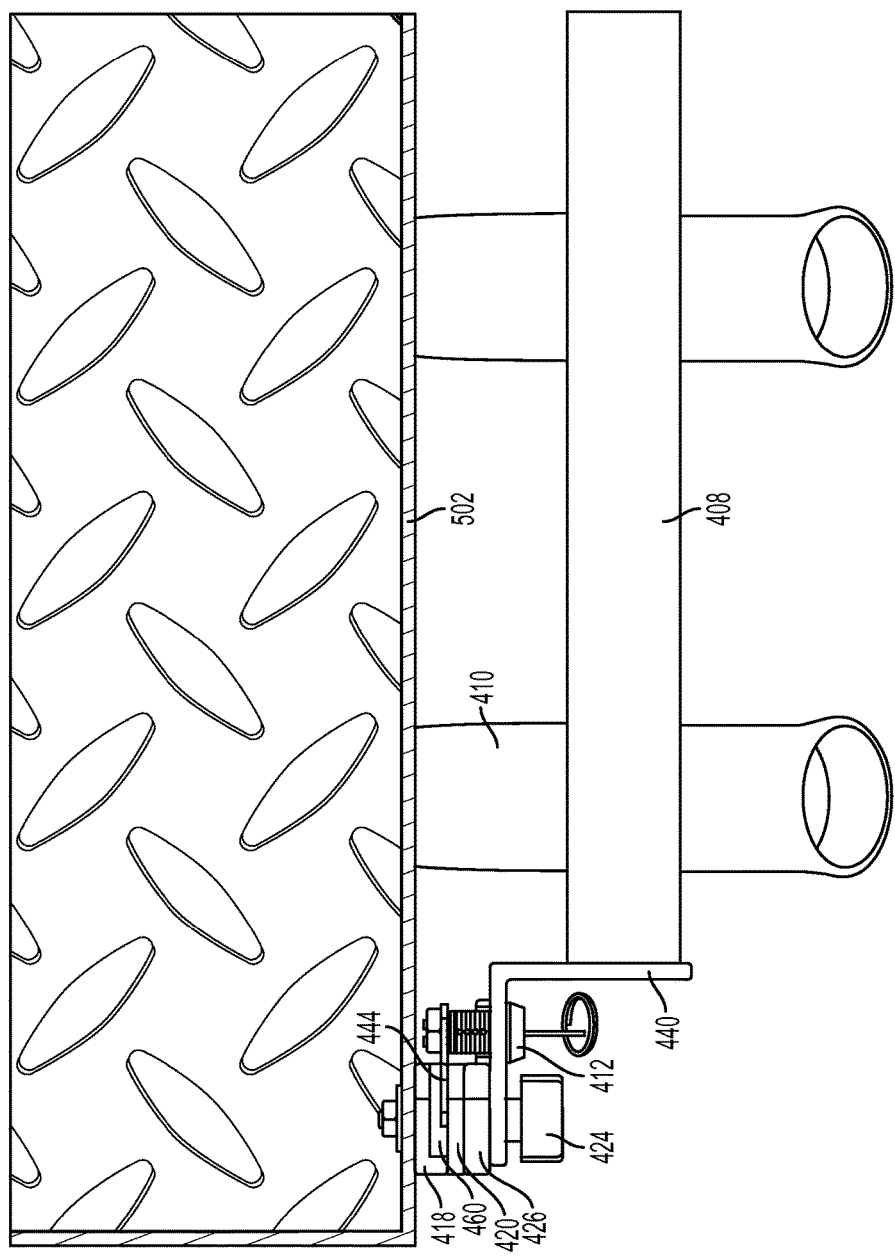

US 10,077,579 B2

ROD HOLDER MOUNTING SYSTEM

CROSS REFERENCES TO RELATED APPLICATIONS

This application is a non-provisional application, claims the benefit, of U.S. Provisional Patent Application Ser. No. 61/718,037, filed Oct. 24, 2012, and entitled ROD HOLDER MOUNTING SYSTEM, the contents of which are incorporated herein by reference in its entirety.

FIELD

The present application generally relates to rod holders. More particularly, the present application relates to fishing rod holders adapted to be mounted on vehicles.

BACKGROUND

When transporting fishing rods and reels, for example, from a residence to a marina site or other location, the fishing rods and reels can become scratched or damaged, and can even be stolen, if the fishing rods and reels are merely stacked or bundled together and placed in a vehicle, such as a bed of a truck. This issue is further compounded by the fact that most late model pickup truck beds are shortened to a length shorter than an average fishing rod. To transport fishing rods and reels in trucks with a shorter bed, the fishing rods and reels typically have to be laid in the truck bed at an angle forcing the fishing rods and reels to be stacked on top of one another in order to be placed in the truck bed. Fishing rod and reel combinations can have a significant and substantial monetary value, for example, ranging from a few dollars to thousands of dollars, depending on the style, type, brand, and quality of the fishing rods and reels. Thus, it is desirable to reduce the risk of unwanted damage to and potential theft of the fishing rods and reels.

SUMMARY OF THE INVENTION

A rod holder system including a mounting bracket adapted to couple to a vehicle, and a cross support having first and second opposing ends, wherein the first end is adapted to couple to the mounting bracket. A rod holder is coupled to the cross support between the first and second ends for holding fishing rods. In an aspect, the mounting bracket is adapted to align with and couple to an existing fastener aperture for a tie down bracket of the vehicle, and allows the tie down bracket to be useable when the mounting bracket remains coupled to the vehicle.

Another rod holder system includes a mounting bracket assembly adapted to couple to a vertically oriented tie down bracket of a vehicle, and a cross support having first and second opposing ends, wherein the first end is adapted to couple to the mounting bracket assembly. A rod holder is coupled to the cross support between the first and second ends for holding fishing rods. In an aspect, the mounting bracket assembly includes a mounting plate adapted to be disposed on a first side of the tie down bracket, a spacer adapted to be disposed on a second side of the tie down bracket, and a mounting bracket adapted to be disposed adjacent the spacer. The mounting bracket is adapted to be coupled to the mounting plate to couple the mounting bracket assembly to the tie down bracket. The mounting bracket may also include a tie down portion adapted to be useable when the mounting bracket assembly is coupled to the tie down bracket of the vehicle.

Yet another rod holder system includes a mounting bracket assembly adapted to couple to a tool box of a vehicle, and a cross support having first and second opposing ends, wherein the first end is adapted to couple to the mounting bracket assembly. A rod holder is coupled to the cross support between the first and second ends for holding fishing rods. In an aspect, the mounting bracket assembly includes a mounting plate adapted to be disposed adjacent to a side of the tool box, and a mounting bracket adapted to be disposed adjacent the mounting plate, wherein the mounting bracket and the mounting plate are adapted to be coupled to the side of the tool box.

These rod holder systems may include a lock mechanism adapted to lock the first end of the cross support to the mounting bracket or mounting bracket assembly. These rod holder systems may also include a cable lock extending from the first end to the second end of the cross support that is adapted to lock one or more rods to the cross support, thus preventing theft or unwanted removal.

BRIEF DESCRIPTION OF THE DRAWINGS

Embodiments of devices, systems, and methods are illustrated in the figures of the accompanying drawings which are meant to be exemplary and not limiting, in which like references are intended to refer to like or corresponding parts, and in which:

FIG. 6 illustrates a perspective view of installing a rod holder sub-assembly of the rod holder mounting system of FIG. 1 on the mounting bracket sub-assembly of FIG. 3;

FIG. 28 illustrates a second side view of the rod holder sub-assembly of FIG. 26 installed on the mounting bracket sub-assembly of FIG. 25.

DETAILED DESCRIPTION OF THE INVENTION

Rod holder mounting systems are disclosed herein. However, it is to be understood that the disclosed embodiments are merely exemplary of the systems, which may be embodied in various forms. Therefore, specific functional details disclosed herein are not to be interpreted as limiting, but merely as a basis for the claims and as a representative basis for teaching one skilled in the art to variously employ the present disclosure.

Rod holder mounting systems for mounting fishing rods and reels in various sizes of truck beds, garages, and other areas are disclosed herein. In one aspect, the rod holder mounting systems can be easily installed in and removed from a bed of a pickup truck. In another aspect, the rod holder mounting systems also allow the rod holders to double as an out of truck rod storage assembly by connecting to a storage base. In another aspect, the rod holder mounting systems are lockable to the truck or structure in the truck, and may also include a locking mechanism to lock the rods and reels in the holders. In another aspect, the rod holder mounting systems hold the rods and reels at an angle providing clearance allowing the truck to pull into a garage while maintaining clearance above rods for the average rod length. In one aspect, a rod holder mounting system is mountable to the truck using existing tie down attaching points avoiding the need to drill additional holes in truck. However, in the event the location of the existing tie down attaching points or tie down brackets is not ideal or the vehicle does not include tie down attaching points, tie down brackets, holes or attachment points for attaching the rod holder mounting system may be created, for example, by drilling and/or tapping.

Figure 1:
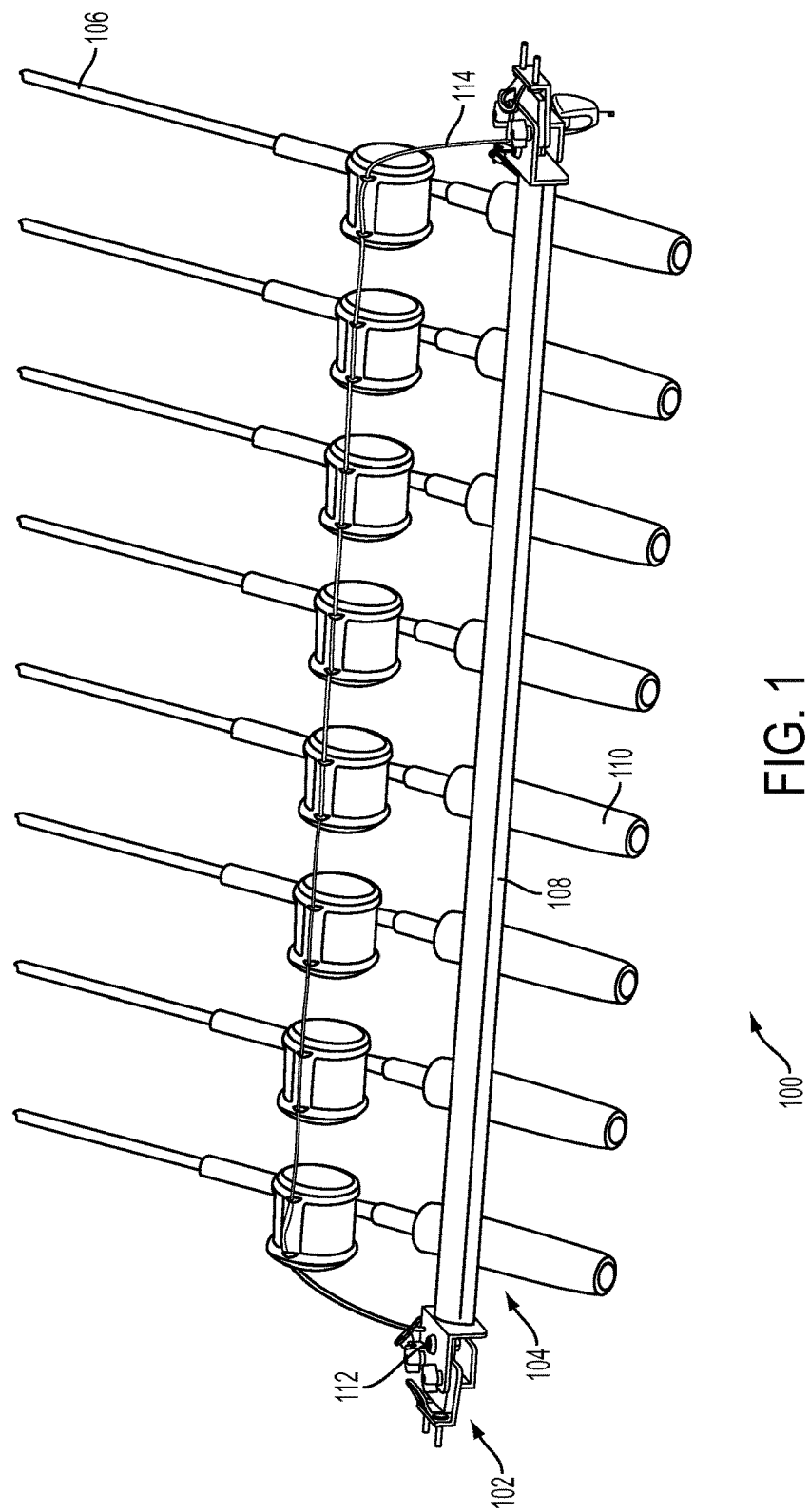
FIG. 1 illustrates a perspective view of a rod holder mounting system according to an embodiment of the present invention.

FIG. 1 illustrates a removable locking rod holder mounting system 100 for a pickup truck according to an embodiment of the present invention. In general, the rod holder mounting system 100 includes first and second mounting bracket sub-assemblies 102 adapted to couple to first and second opposing ends of a rod holder sub-assembly 104. The rod holder mounting system 100 allows for the transportation of fishing rods and reels 106 in a pickup truck and locks both the rod holder sub-assembly 104 to the truck and the rods and reels to the mounting system 100. In this embodiment, the rod holder mounting system 100 includes the first and second mounting bracket sub-assemblies 102 which respectively couple to first and second opposing ones of the truck's existing tie down bracket coupling locations, and the rod holder sub-assembly 104. The rod holder sub-assembly 104 includes a cross bar 108 with rod holder tubes 110 and first and second locking systems 112 adapted to couple the cross bar 108 to the first and second mounting bracket sub-assemblies 102, respectively. The rod holder mounting system 100 may also incorporate a cable locking system 114 for reducing the risk of theft of the rods and reels 106.

Figure 2:
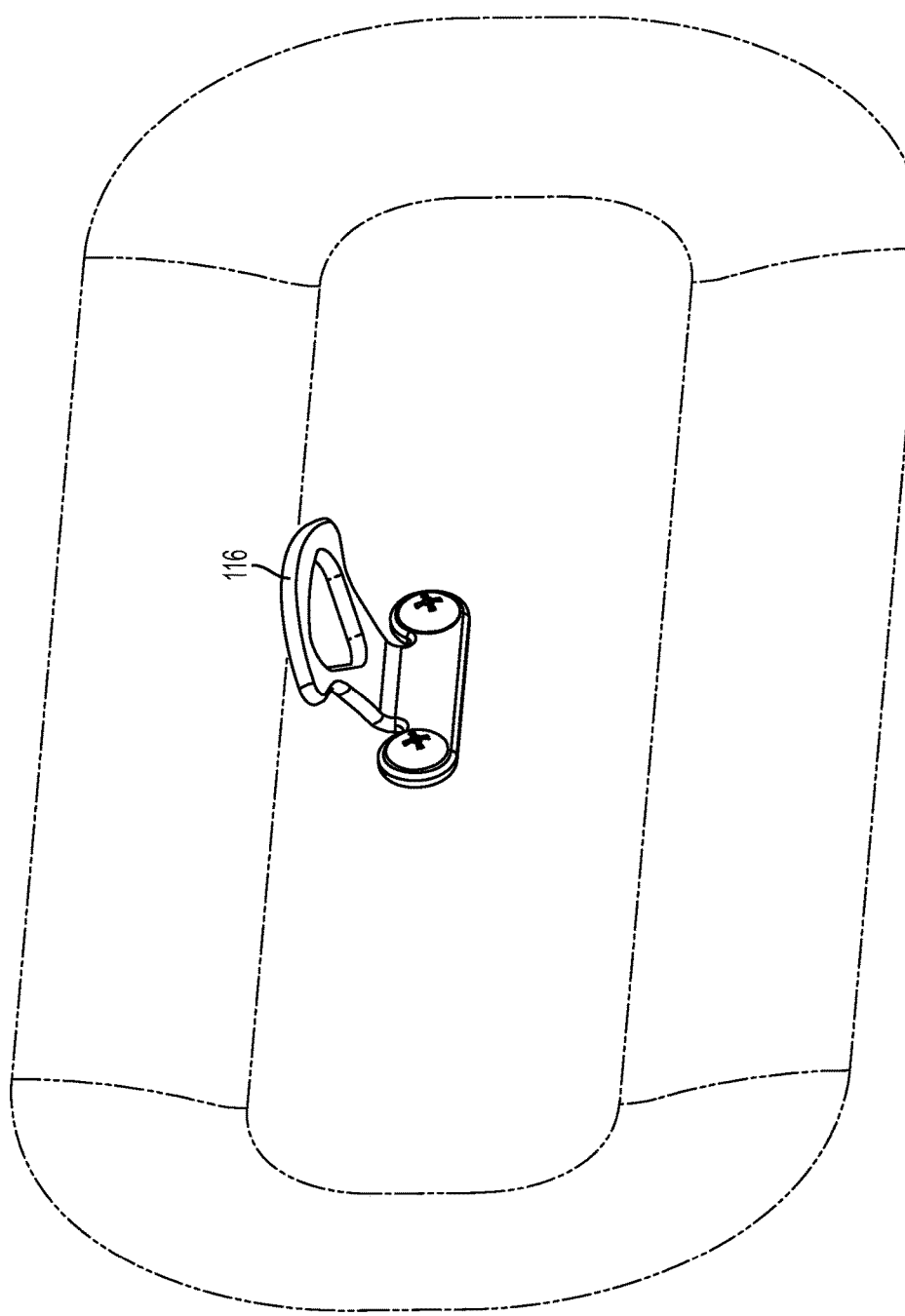
FIG. 2 illustrates a perspective view of an existing tie down bracket according to an embodiment of the present invention.
Figure 3:
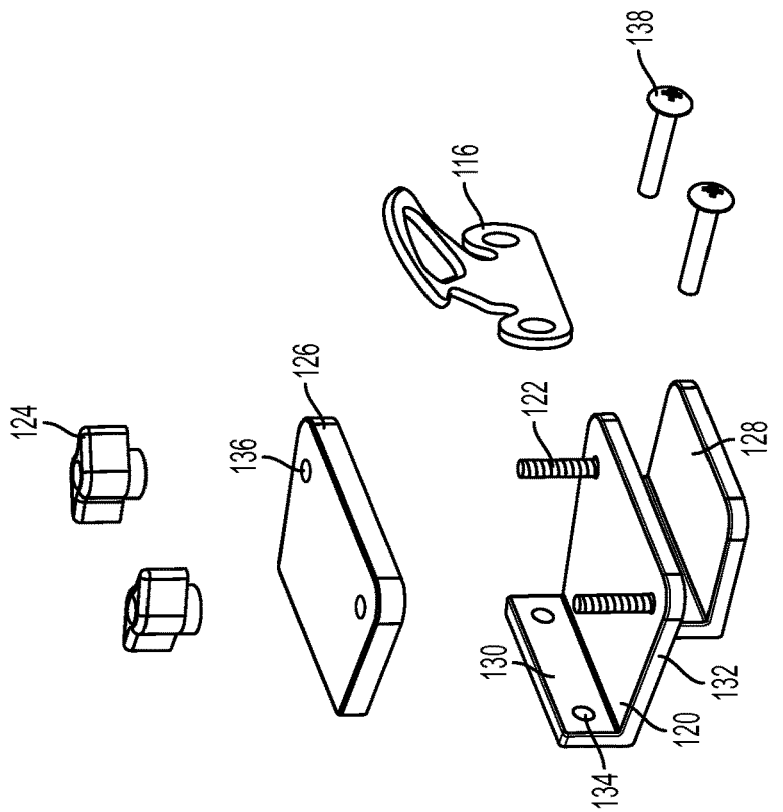
FIG. 3 illustrates an exploded perspective view of a mounting bracket sub-assembly of the rod holder mounting system of FIG. 1.
Figure 4:
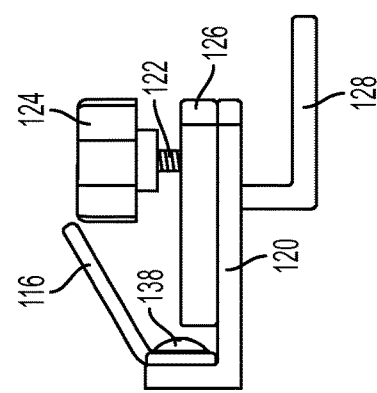
FIG. 4 illustrates a side view of the mounting bracket sub-assembly of FIG. 3 in an installed configuration.

Installing the rod holder mounting system 100 includes removing existing typical tie down brackets, often located in truck beds. A typical tie down bracket 116 in a pickup truck bed is illustrated in FIG. 2. For the sake of brevity, the installation of the first mounting bracket sub-assembly 102 is described, and it should be appreciated that the second mounting bracket sub-assembly is substantially the same as and may be installed in substantially the same manner as the first mounting bracket sub-assembly 102. As illustrated in FIGS. 3 and 4, the rod holder mounting system 100 uses the existing tie down bracket mounting holes 118 and the tie down bracket 116 in conjunction with a mounting bracket 120 to form a bracket in the truck bed liner that can accept the rod holder sub-assembly 104 for holding fishing rods and reels during transport. The rod holder mounting system 100 includes the mounting bracket 120 that can be coupled to the truck utilizing the existing truck tie down bracket mounting attachments, thereby eliminating the need to drill additional holes in the pickup truck bed. The tie down brackets 116 are removed from the truck bed and then remounted on top of the mounting bracket/assembly to maintain the usability of the tie down brackets 116 for conventional purposes.

The first mounting bracket sub-assembly 102 according to an illustrative embodiment, is described with reference to FIGS. 3 and 4. The first mounting bracket sub-assembly 102 may include the mounting bracket 120 with retaining studs or threaded fasteners 122, corresponding nuts such as thumbscrews 124, a spacer 126, and a shield plate or lock guard 128 extending from a surface of the mounting bracket 120 opposite the fasteners 122 to block access to a lock cam (described in further detail below) when the rod holder cross support is installed. This reduces the risk of theft by preventing the removal of the lock cam.

The mounting bracket 120 includes a first portion 130 and a second portion 132 extending from and orthogonal to the first portion 130. The first portion 130 of the mounting bracket may include first apertures 134 and is adapted to couple to a sidewall of a truck bed. The second portion 132 of the mounting bracket may include the fasteners 122. The spacer 126 may be disposed on a first side of the second portion 132 of the mounting bracket 120 and may include apertures 136 adapted to align with and receive the fasteners 122. The lock guard 128 may be coupled, for example, by welding, to the mounting bracket 120 on a second side of the second portion 132 of the mounting bracket 120 opposite the first side of the second portion 132 of the mounting bracket 120.

The mounting bracket 120, spacer 126, and lock guard 128 are adapted to couple the rod holder sub-assembly 104 to a truck bed or liner of a truck bed. When the cross support and the spacer 126 are in place, mounting bolts 138 that extend through apertures 134 of the mounting bracket 120 and into the mounting holes 118 are blocked from being removed by the spacer 126 and cross support 108 reducing the risk of theft by removing the mounting bolts 138. The apertures 134 in the mounting bracket 120 are disposed or positioned to align with the existing mounting holes 118 of the existing tie down bracket 116 of the truck.

As described above, the rod holder mounting system 100 may be installed in a truck bed while preserving the use and functionality of existing tie down brackets in the truck bed. As illustrated in FIG. 3, an existing tie down bracket 116 of the truck bed is removed. The mounting bracket 120 is aligned with and disposed proximal to the existing fastener apertures 118 of the tie down bracket 116, and the tie down bracket 116 and the mounting bracket 120 are coupled to the truck bed with fasteners 138 using the existing fastener apertures 118. The fasteners 138 may be bolts longer than the bolts used to couple the existing tie down bracket 116 to the truck bed to accommodate the thickness of the mounting bracket 120.

Figure 5B:
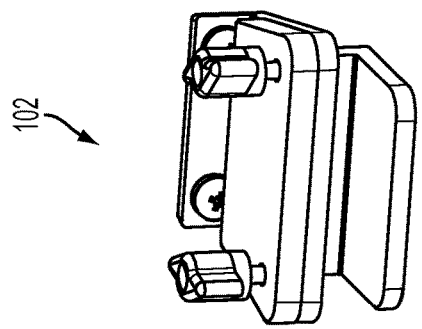
FIGS. 5A and 5B illustrate perspective views of the mounting bracket sub-assembly of FIG. 3 in an installed configuration.
Figure 5A:
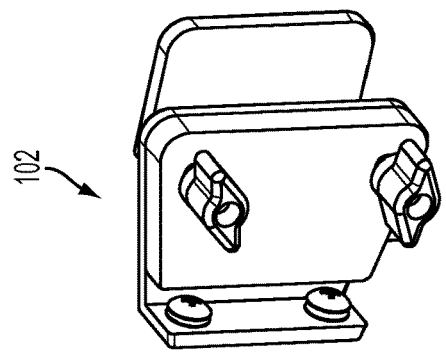

The apertures 136 of the spacer 126 are aligned with the fasteners 122 extending from the mounting bracket 120 and disposed on the mounting bracket 120. The spacer 126 may restrict access to the fasteners 138 to prevent the mounting bracket 120 from being removed when the system is installed. Retaining nuts, wing nuts or thumbscrews 124 are coupled to the fasteners 122 to secure the spacer 126 in place on the mounting bracket when the rod holder sub-assembly is not installed, as illustrated in FIGS. 5A and 5B.

Different pickup trucks and other vehicles may have different orientations of tie down brackets 116, for example, horizontal or vertical mounted tie down brackets. The mounting bracket sub-assembly 102 may be utilized in either orientation. FIG. 5A illustrates the mounting bracket sub-assembly 102 coupled in a vertical orientation on a sidewall of a bed of a pickup truck. FIG. 5B illustrates the mounting bracket sub-assembly 102 coupled in a horizontal orientation on a sidewall of a bed of a pickup truck.

The rod holder sub-assembly 104 according to an illustrative embodiment, is described with reference to FIGS. 1 and 6. In this embodiment, the rod holder sub-assembly 104 includes a cross support or cross bar 108, which is a horizontal support including rod holders, for example in the form of tubes 110, coupled along the length of the cross support 108 or between the ends of the cross support 108. The rod holder sub-assembly 104 includes first and second rod holder brackets or acceptor plates 140 coupled to opposing ends of the cross support 108. The first and second acceptor plates 140 include apertures 142 corresponding to and adapted to receive the fasteners 122 on the mounting brackets 120. The apertures 142 may be elongated to allow for slight variations in pickup truck bed widths.

The cross support 108 may be welded to the acceptor plates 140 at an angle and/or the rod holder tubes 110 may be coupled to the cross support 108 at an angle, for example about 30 to 60 degrees, so as to reduce the height of the rod holders or rods held in the holders for transport. This allows the truck to pull into a garage with the rods in place without damaging the rods, for example. A locking mechanism 112 including a cam lock 144 may be coupled on one or more of the first and second acceptor plates 140 of the rod holder sub-assembly 104 and is adapted to lock the cross support 108 in place.

Figure 7:
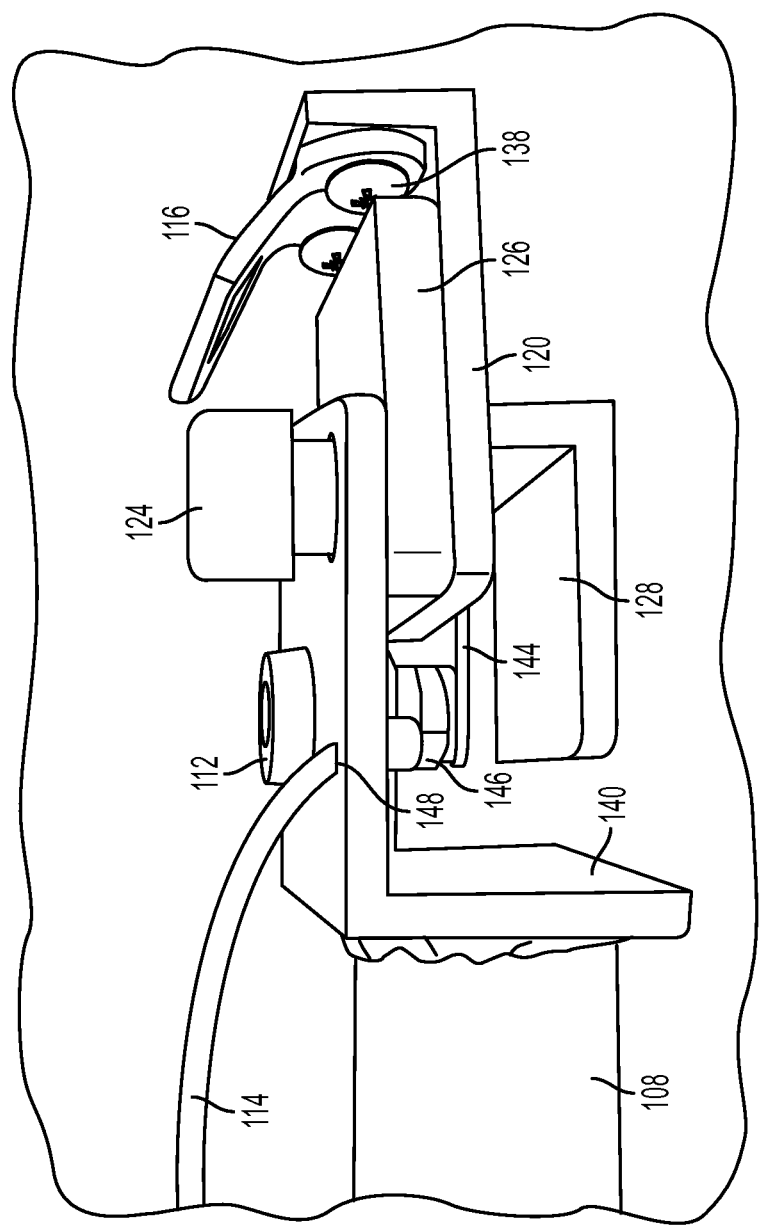
FIG. 7 illustrates a perspective view of the rod holder sub-assembly of FIG. 6 installed on a mounting bracket sub-assembly.

FIG. 7 illustrates the rod holder sub-assembly 104 coupled to the mounting bracket sub-assembly 102, on a right side or second side of the rod holder mounting system 100. As illustrated in FIG. 7, the acceptor plate 140 is coupled to the mounting bracket 120. The thumbscrews 124 are adapted to hold the parts together while the cam locks 144 secure the rod holder sub-assembly 104 to the mounting bracket sub-assembly 102. The cam lock 144, when rotated to a locked position, slides under or engage the mounting bracket 120 while the lock guard 128 limits access to the projection or cam 144. Additionally, a lock cam screw 146 is blocked from removal by the lock guard 128 on the mounting bracket 120, and the removal of the fasteners 130 from the truck is blocked by the combination of the spacer 126 and the acceptor plate 140 on the cross support 108. This reduces the risk of theft of the complete unit from the truck.

Once the rod holder mounting system 100 is installed, various fishing rods and reels may be placed in the holders for transport. The holders 110 may be spaced apart to prevent the reels on adjacent fishing rods from touching. The holders 110 may also be positioned at an angle to allow for the truck to be pulled into a standard garage without the fishing rods hitting or being damaged by the door frame of the garage, for example.

Figure 8:
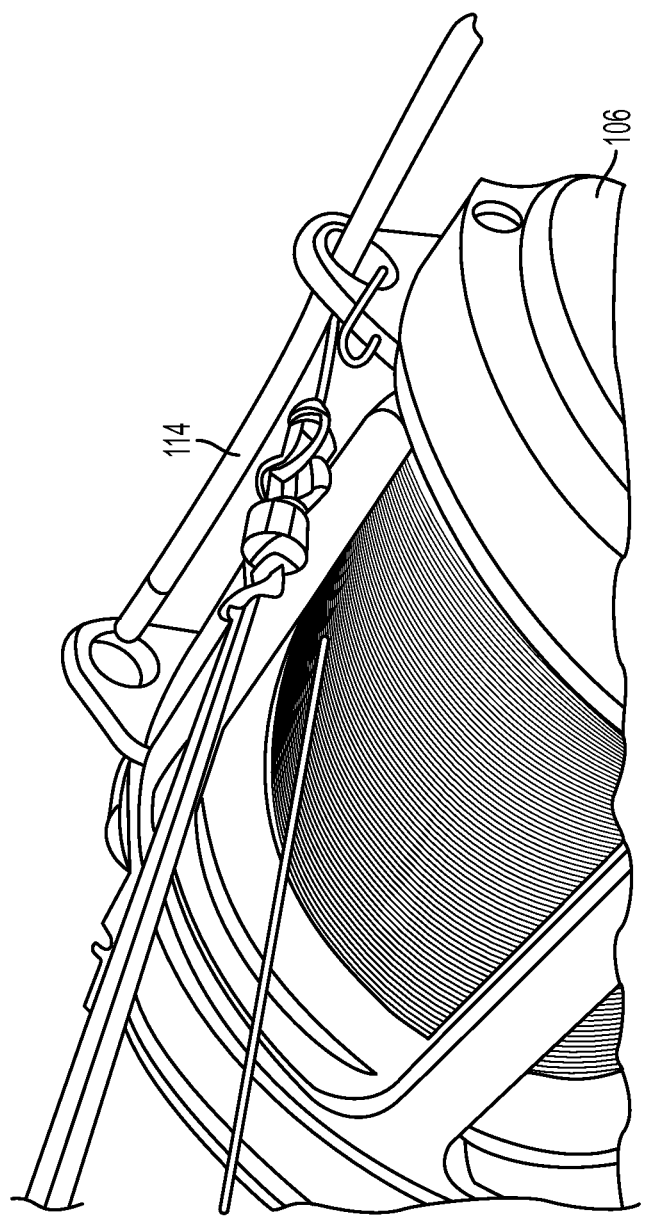
FIG. 8 illustrates a perspective view of a cable lock of the rod holder mounting system of FIG. 1.
Figure 9:
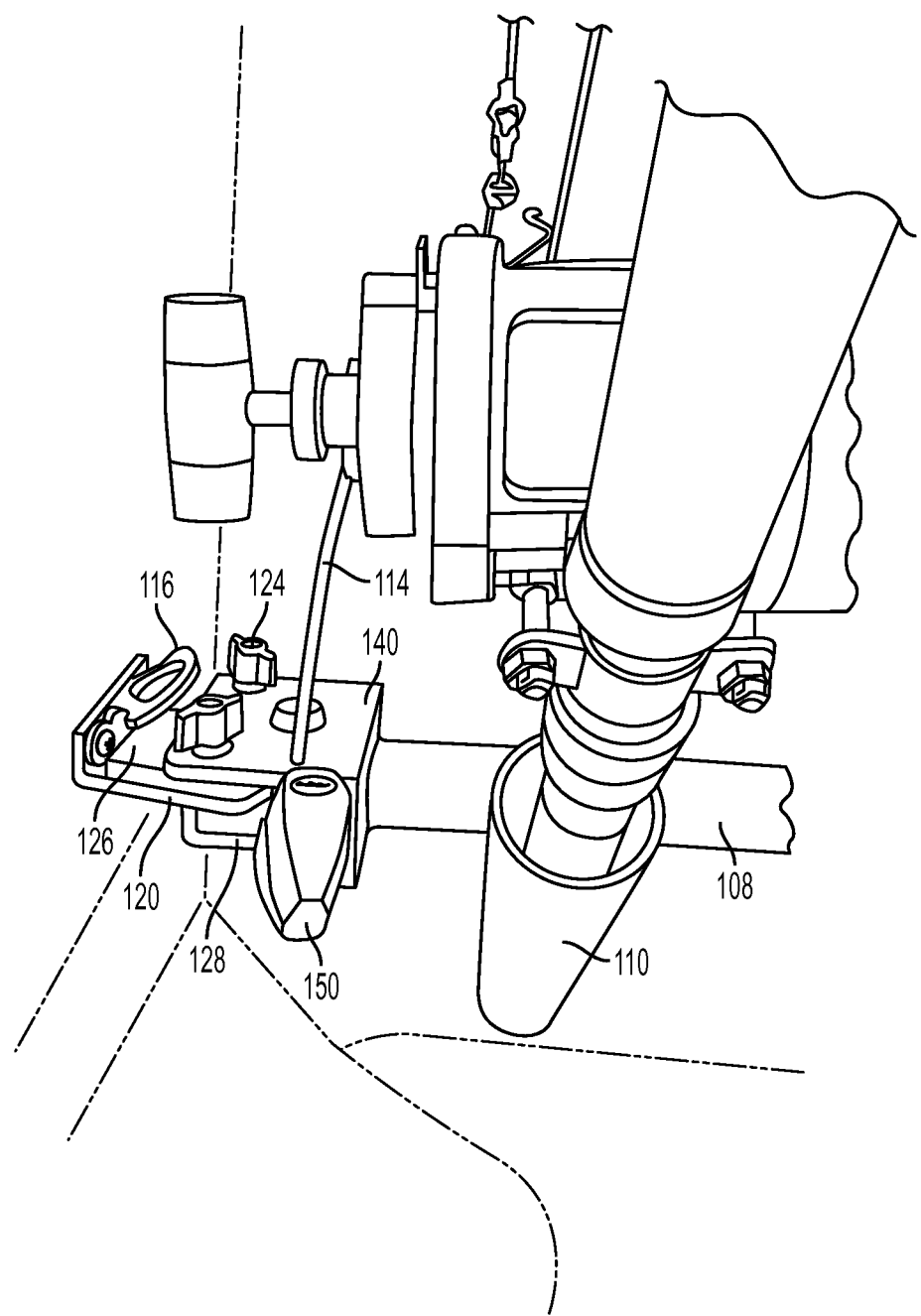
FIG. 9 illustrates another perspective view of a cable lock of the rod holder mounting system of FIG. 1.

The acceptor plates 140 may also have apertures 148, as illustrated in FIGS. 6 and 7, which incorporate the cable locking system 114 that can be used to run a cable lock through the fishing rods and reels 106, as illustrated in FIG. 8, to secure the fishing rods and reels 106 to the rod holder sub-assembly 104 reducing the risk of theft. FIGS. 7-9 illustrate the rod holder mounting system 100 with the cable locking system 114 installed. As illustrated in FIG. 7, the cable 114 runs up through a second aperture 148 in one side of the bracket or second acceptor plate 140, though apertures on the reels 106 or coupled to the reels or rods, as illustrated in FIG. 8, and then down though a first aperture 148 in the other bracket or first acceptor plate 140, as illustrated in FIG. 9. The cable lock, locking mechanism 150, is then coupled onto the cable 114 and locked in place. This effectively locks the reels 106 to the rod holder sub-assembly 104.

Additionally, the cable locking system 114 may be installed when there are no rods and reels being held in the rod holder mounting system 100. When there are no rods and reels held in the rod holder mounting system 100, the cable extends through the through the first and second apertures 148 and is locked in place.

The system allows for the rod holder assembly to be easily installed and uninstalled. The system may incorporate a locking system adapted to lock the rod holder assembly to the truck bed. This allows the rod holder assembly to be left in the truck at the marina or boat ramp without the worry of it being stolen. Additionally, the use and functionality of the tie down brackets is maintained allowing the tie down brackets to be used for tying down cargo or for use of a cable locking system that may be incorporated to lock the fishing rods and reels in the rod holder assembly. The cable locking system may be desirable to prevent the fishing rods and reels from being taken out of the holder and any type of grab and go theft out of the holder.

Figure 10:
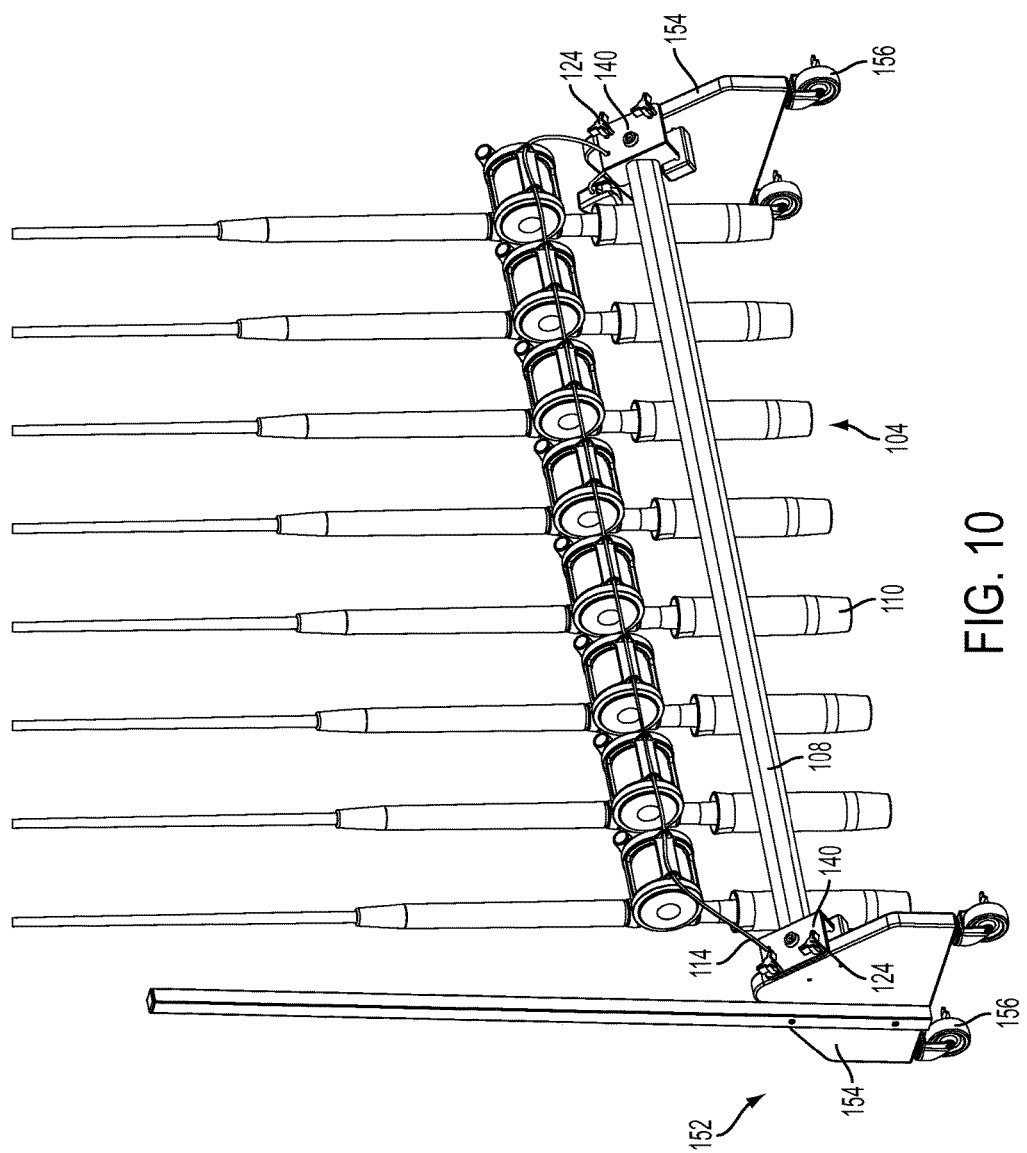
FIG. 10 illustrates a perspective view of a rolling base for a rod holder mounting system according to an embodiment of the present invention.

As described above, the rod holder mounting system also allows the rod holder to double as an out of truck rod storage assembly by connecting to a storage base. Such as base 152 illustrated in FIG. 10. This base 152 allows the rod holder sub-assembly 104 to be removed from the truck and coupled to an optional rolling storage system. The rod holder sub-assembly 104 is secured to mounts 154, which may include rollers 156, by utilizing thumbscrews 124. This effectively creates a rolling storage rack which can be used to rinse off rods and reels outside and then roll them into the garage or other area for storage, for example. This storage rack can be locked to a stud mounted eye-bolt using the same cable locking system 114 which locks the rods to the rod holder sub-assembly 104. This adds additional theft protection of valuable rods and reels stored outside the truck.

Figure 11:
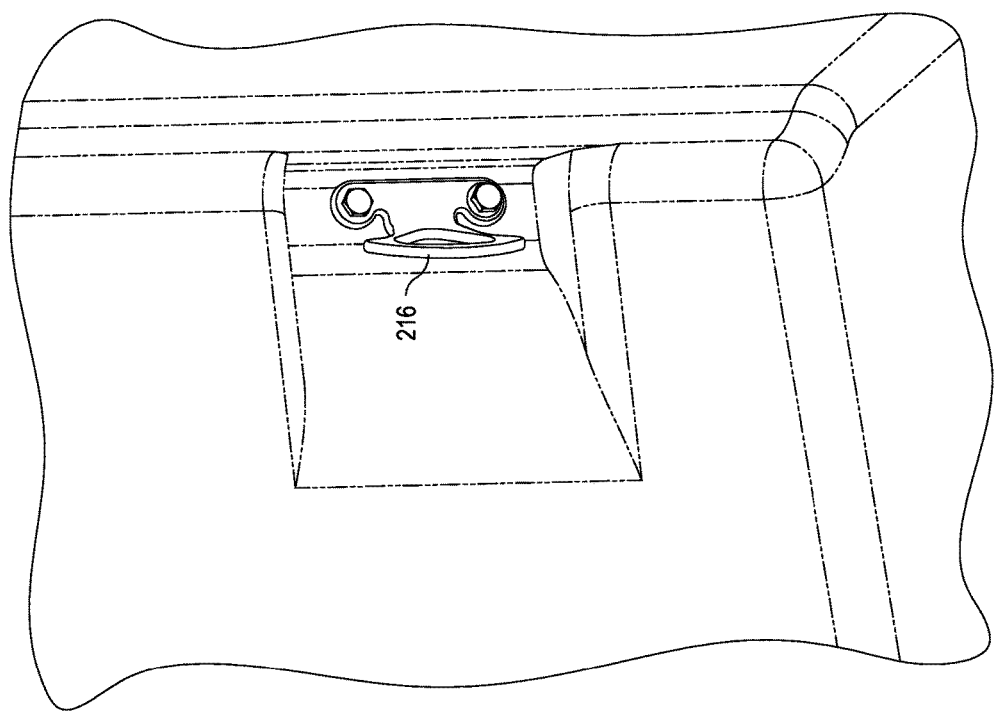
FIG. 11 illustrates a perspective view of an existing vertically oriented tie down bracket according to an embodiment of the present invention.
Figure 12:
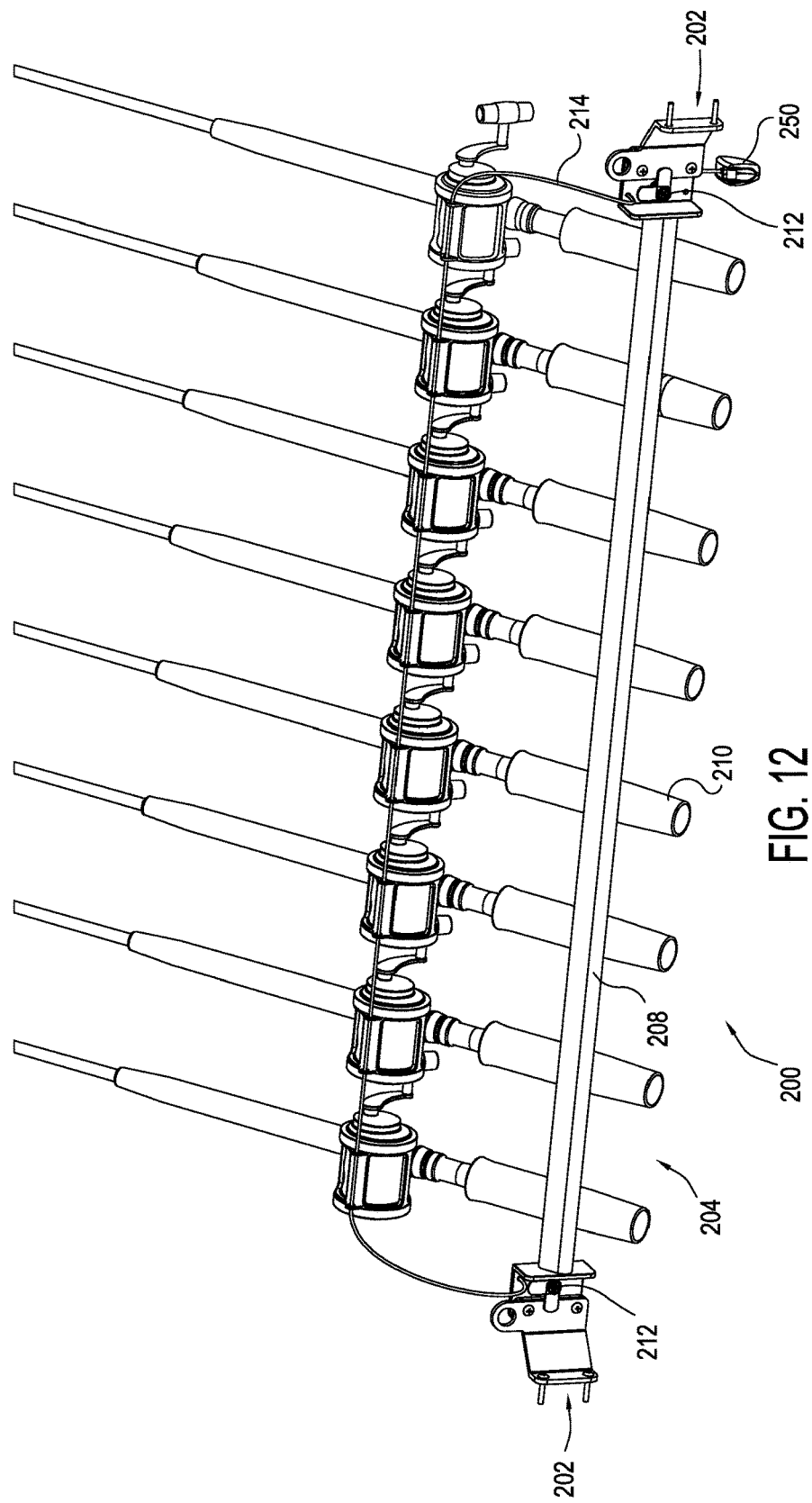
FIG. 12 illustrates a perspective view of a rod holder mounting system according to an embodiment of the present invention.

There are some vehicles that include vertically oriented tie down brackets, for example, tie down bracket 216 illustrated in FIG. 11, that are disposed in a recess in a vehicle or truck bed. FIG. 12 illustrates another removable locking rod holder mounting system 200 adapted to couple to first and second opposing ones of the truck's existing tie down bracket coupling locations. In general, the rod holder mounting system 200 includes first and second mounting bracket sub-assemblies 202 adapted to couple to first and second opposing ends of a rod holder sub-assembly 204. In this embodiment, the rod holder mounting system 200 includes the first and second mounting bracket sub-assemblies 202 which respectively mount to the first and second opposing ones of the truck's existing tie down bracket coupling locations, and the rod holder sub-assembly 204. The rod holder sub-assembly 204 includes a cross bar 208 with rod holder tubes 210 and first and second locking systems 212 adapted to couple the cross bar 208 to the first and second mounting bracket sub-assemblies 202, respectively. The rod holder mounting system 200 may also incorporate a cable locking system 214 for reducing the risk of theft of rods and reels disposed in the rod holder tubes 210.

Figure 13:
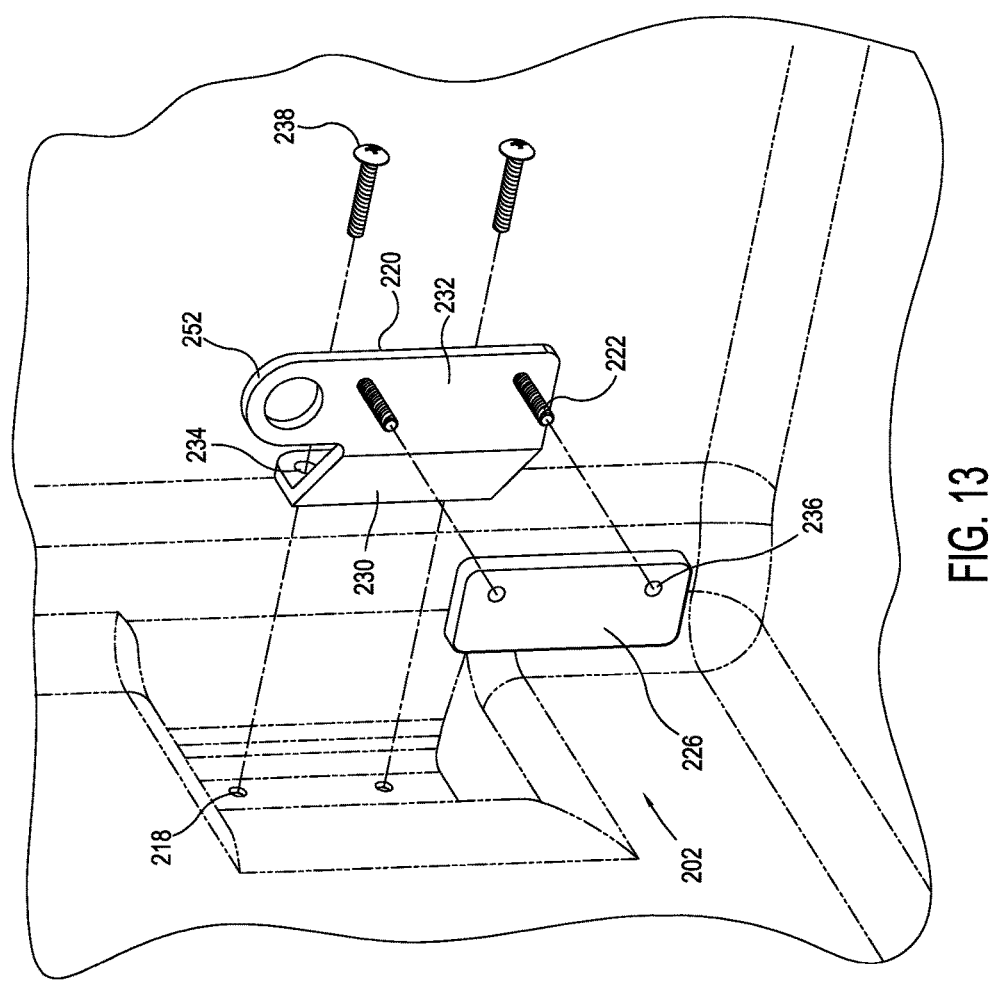
FIG. 13 illustrates an exploded perspective view of a mounting bracket sub-assembly of the rod holder mounting system of FIG. 12.

As illustrated in FIG. 13, installing the rod holder mounting system 200 includes coupling the mounting bracket sub-assemblies 202 to existing tie down bracket coupling locations, typically found in truck beds. For example, the tie down brackets 216 (illustrated in FIG. 11) are removed from the truck bed exposing respective mounting holes 218, and the mounting bracket sub-assemblies 202 are coupled to the mounting holes 218. For the sake of brevity, the installation of the first mounting bracket sub-assembly 202 is described, and it should be appreciated that the second mounting bracket sub-assembly is substantially the same as and may be installed in substantially the same manner as the first mounting bracket sub-assembly 202.

The first mounting bracket sub-assembly 202 may include a mounting bracket 220 with retaining studs or threaded fasteners 222, corresponding nuts such as thumbscrews 224 (illustrated in FIG. 14), and a spacer 226. The mounting bracket 220 includes a first portion 230 and a second portion 232. As illustrated, the first portion 230 is angled with respect to the second portion 232 to account for the contour of the side of the truck bed, and includes a mounting portion including first apertures 234 adapted to couple the mounting bracket 220 to a sidewall of a truck bed. The second portion 232 of the mounting bracket 220 may include fasteners 222 extending therefrom. The spacer 226 may be disposed on a first side of the second portion 232 of the mounting bracket 220 and may include apertures 236 adapted to align with and receive the fasteners 222.

To install the mounting bracket sub-assemblies 202, the mounting bracket 220 may be aligned with and disposed proximal to the existing fastener apertures 218 of the tie down bracket 216, and the mounting bracket 220 may be coupled to the truck bed by disposing fasteners 238 into the existing mounting holes 218. The rod holder sub-assembly 204 may then be installed on the mounting bracket sub-assemblies 202.

The rod holder sub-assembly 204, according to an illustrative embodiment, is described with reference to FIGS. 12, 14, and 15. In this embodiment, the rod holder sub-assembly 204 includes a cross support or cross bar 208, which is a horizontal support including rod holders, for example in the form of tubes 210, coupled along the length of the cross support 208 or between the ends of the cross support 208. The rod holder sub-assembly includes first and second rod holder brackets or acceptor plates 240 coupled to opposing ends of the cross support 208. The first and second acceptor plates 240 include apertures 242 corresponding to and adapted to receive the fasteners 222 on the mounting brackets 220. The apertures 242 may be elongated to allow for slight variations in pickup truck bed widths.

The cross support 208 may be welded to the acceptor plates 240 at an angle and/or the rod holder tubes 210 may be coupled to the cross support 208 at an angle so as to reduce the height of the rod holders for transport. This allows the truck to pull into a garage with the rods in place without damaging the rods, for example. A locking mechanism 212 including a cam lock 244 may be coupled on one or more of the first and second acceptor plates 240 of the rod holder sub-assembly and is adapted to lock the cross support 208 in place.

Figure 14:
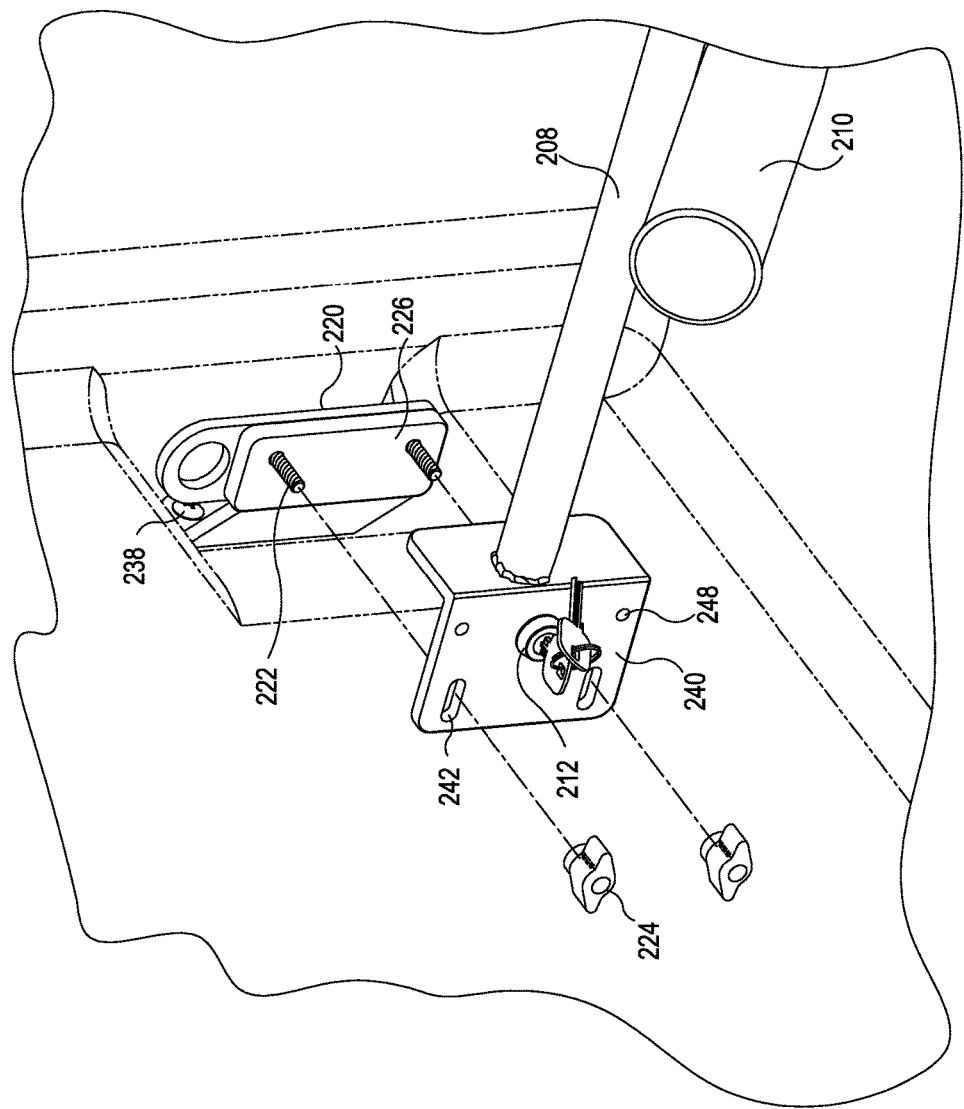
FIG. 14 illustrates a perspective view of installing a rod holder sub-assembly of the rod holder mounting system of FIG. 12 on the mounting bracket sub-assembly of FIG. 13.
Figure 15:
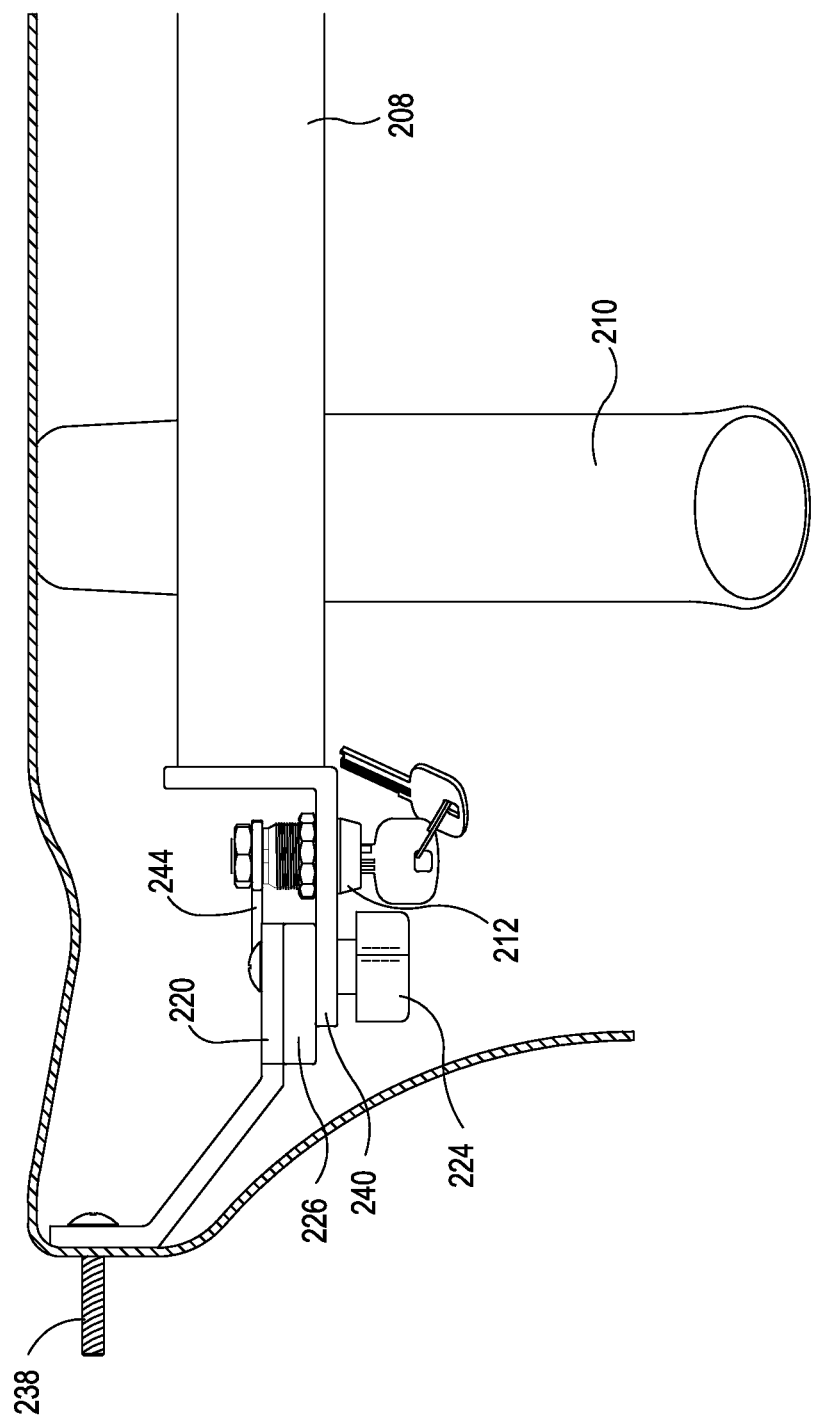
FIG. 15 illustrates a perspective view of the rod holder sub-assembly of FIG. 14 installed on the mounting bracket sub-assembly of FIG. 13.

FIGS. 14 and 15 illustrate mounting the rod holder sub-assembly 204 to the mounting bracket sub-assembly 202. As illustrated, the acceptor plate 240 is coupled to the mounting bracket 220, via fasteners 222, and retaining nuts, wing nuts or thumbscrews 224 are threaded onto the fasteners 222 and adapted to hold the parts together while the cam lock 244 secures the rod holder sub-assembly 204 to the mounting bracket sub-assembly 202. The cam lock 244, when rotated to a locked position, slides behind or engages the mounting bracket 220.

As illustrated in FIGS. 12 and 14, the acceptor plates 240 may also have apertures 248 which incorporate the cable locking system 214 that can be used to run a cable lock through the fishing rods and reels to secure the fishing rods and reels to the rod holder sub-assembly 204 to reduce the risk of theft. As described above, the cable 214 runs up through a first aperture 248 in one side of the bracket or first acceptor plate 240, though apertures on the reels or coupled to the reels or rods, and then down though a second aperture 248 in the other bracket or second acceptor plate 240, as illustrated in FIG. 12. A cable lock, locking mechanism 250, is then coupled onto the cable 214 and locked in place. Additionally, the cable locking system 214 may be installed when there are no rods and reels being held in the rod holder mounting system 200.

As illustrated in FIGS. 13 and 14, the mounting bracket 220 may also include a tie down portion 252. This allows the use and functionality of a tie down to be maintained allowing the tie down to be used for tying down cargo when the mounting bracket sub-assembly 202 is installed. The rod holder mounting system 200 may also double as an out of truck rod storage assembly by connecting to a storage base, as described above with reference to FIG. 10. This allows the rod holder mounting system 200 to be used to rinse off rods and reels outside and then roll them into the garage or other area for storage, for example.

Figure 16:
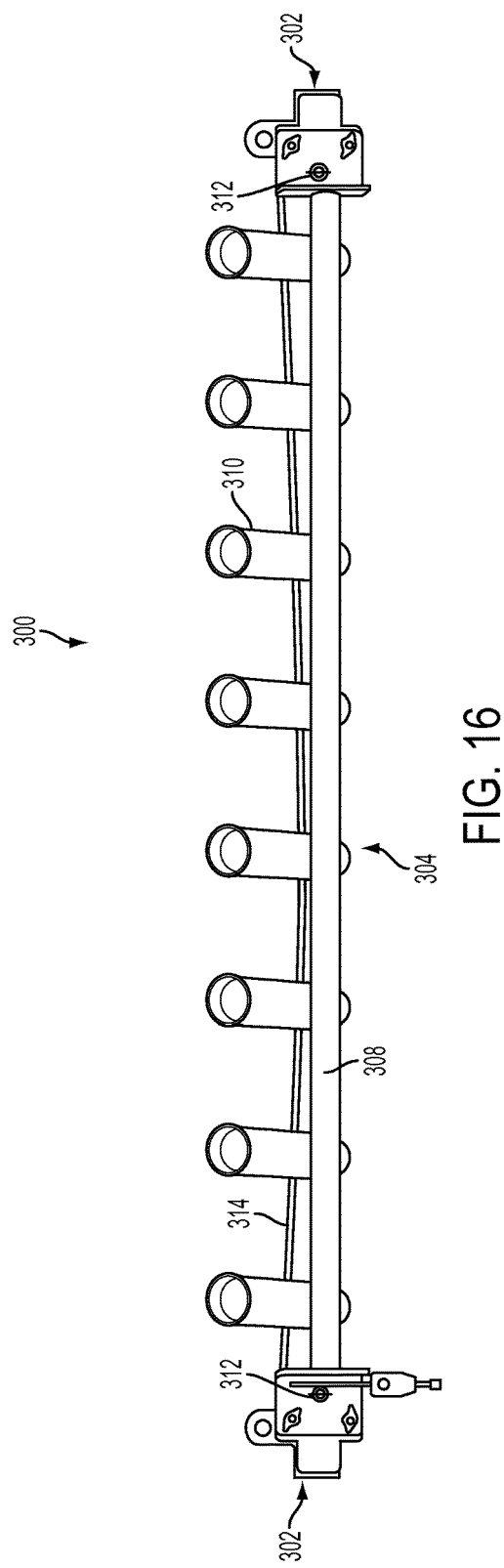
FIG. 16 illustrates a perspective view of a rod holder mounting system according to an embodiment of the present invention.

There are some vehicles that include vertically oriented tie down brackets which may be welded or permanently installed and cannot be removed. FIG. 16 illustrates another removable locking rod holder mounting system 300 adapted to couple to a vertically oriented tie down bracket according to an embodiment of the present invention. In general, the rod holder mounting system 300 includes first and second mounting bracket sub-assemblies 302 adapted to couple to first and second opposing ends of a rod holder sub-assembly 304. In this embodiment, the rod holder mounting system 300 includes the first and second mounting bracket sub-assemblies 302 which respectively mount to first and second opposing ones of the truck's existing tie down brackets, and the rod holder sub-assembly 304. The rod holder sub-assembly 304 includes a cross bar 308 with rod holder tubes 310 and first and second locking systems 312 adapted to couple the cross bar 308 to the first and second mounting bracket sub-assemblies 302, respectively. The rod holder mounting system 300 may also incorporate a cable locking system 314 for reducing the risk of theft of rods and reels disposed in the rod holder tubes 310.

Figure 17:
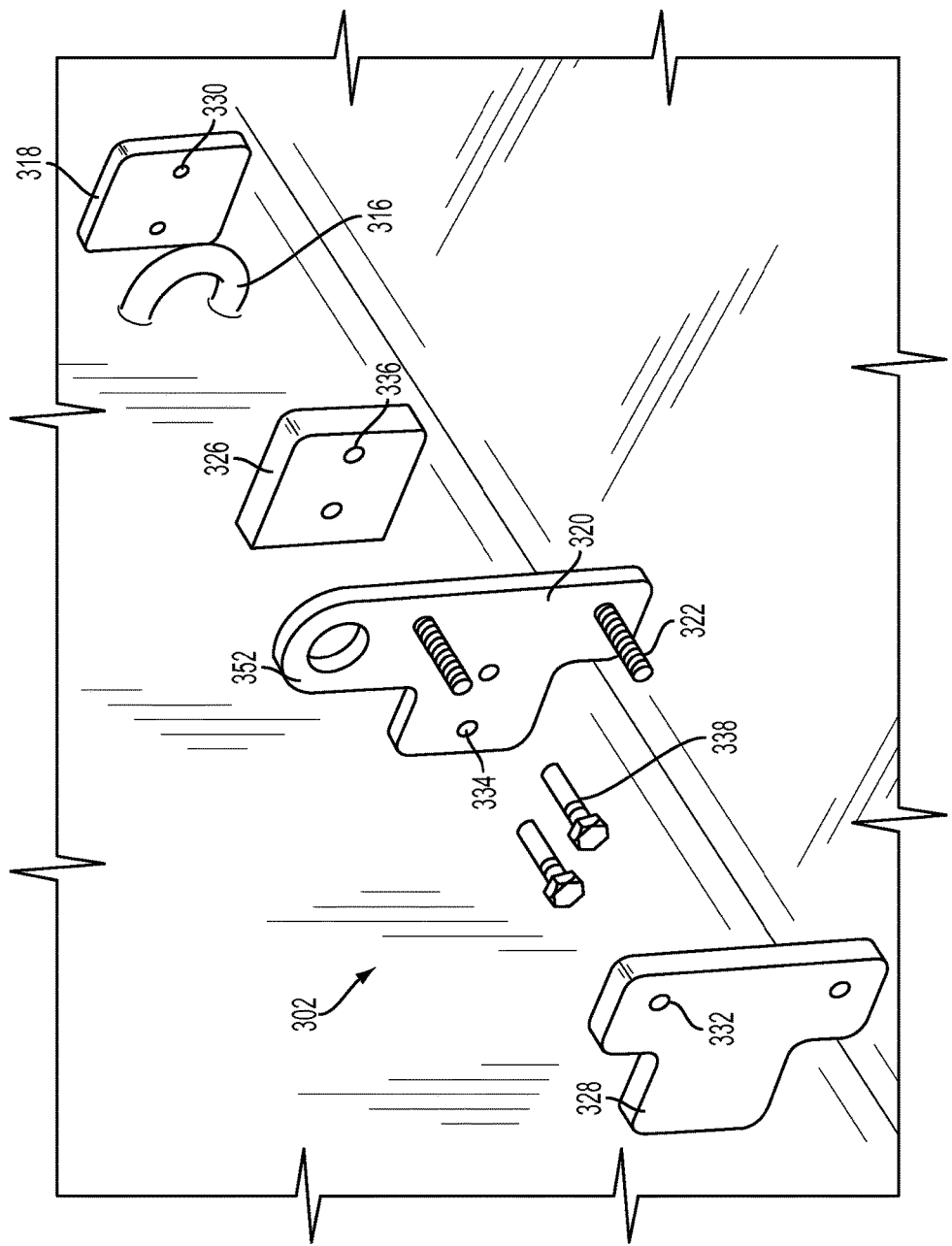
FIG. 17 illustrates an exploded perspective view of a mounting bracket sub-assembly of the rod holder mounting system of FIG. 16.
Figure 18:
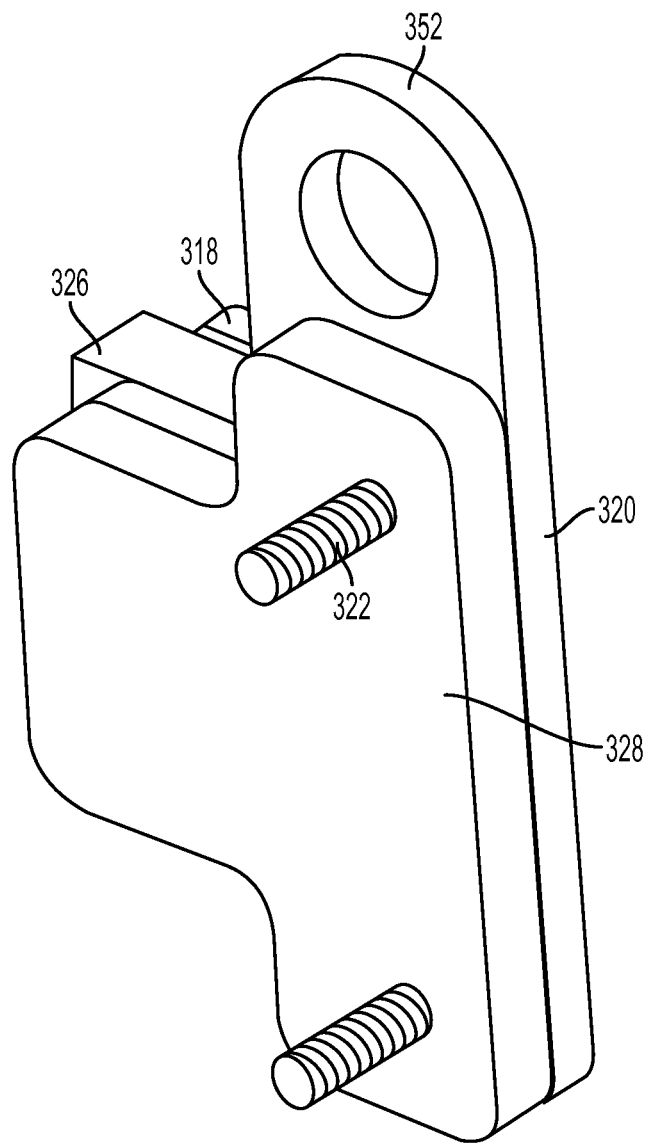
FIG. 18 illustrates a perspective view of the mounting bracket sub-assembly of FIG. 17 installed.
Figure 19:
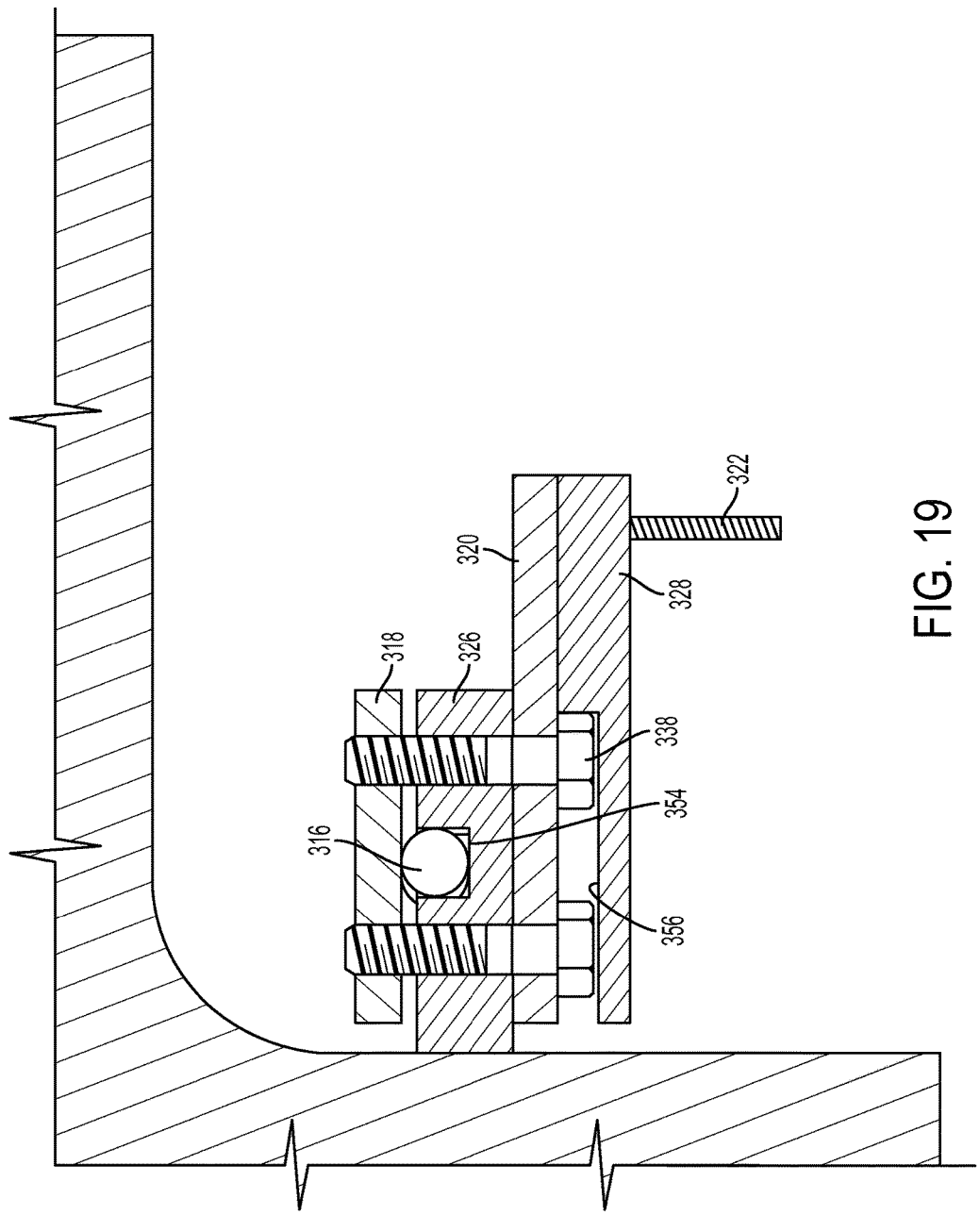
FIG. 19 illustrates a cross sectional view of the mounting bracket sub-assembly of FIG. 18.

As illustrated in FIGS. 17-19, installing the rod holder mounting system 300 includes clamping the mounting bracket sub-assemblies 302 onto existing tie down brackets 316, typically found in truck beds. For the sake of brevity, the installation of the first mounting bracket sub-assembly 302 is described, and it should be appreciated that the second mounting bracket sub-assembly is substantially the same as and may be installed in substantially the same manner as the first mounting bracket sub-assembly 302. As illustrated in FIGS. 17-19, the rod holder mounting system 300 sandwiches the existing tie down bracket 316 between brackets to form a bracket in the truck bed liner that can accept the rod holder sub-assembly 304 for holding fishing rods and reels during transport.

The first mounting bracket sub-assembly 302, according to an illustrative embodiment, is described with reference to FIGS. 17-19. The first mounting bracket sub-assembly 302 may include a mounting plate 318, a mounting bracket 320 with retaining studs or fasteners 322, a spacer 326, and a guard 328. The mounting plate 318 includes threaded apertures 330 adapted to receive fasteners 338, the mounting bracket 320 includes apertures 334 adapted to receive the fasteners 338, and the spacer 326 includes apertures 336 adapted to receive the fasteners 338.

The mounting plate 318 is disposed on a first side of the tie down bracket 316 and the spacer 326 is disposed on a second side of the tie down bracket 316, and the apertures 330 and 336 are aligned. The mounting bracket 320 is disposed adjacent the spacer 326 and the apertures 334 are aligned with the apertures 336. The fasteners 338 are disposed through the apertures 334, the apertures 336, and threaded into the apertures 330, thereby clamping the tie down bracket 316 between the spacer 326 and the mounting plate 318.

The guard 328 may then be disposed on the mounting bracket 320, by aligning apertures 332 with and disposing the apertures 332 on the fasteners 322, as illustrated in FIG. 18. The guard 328 may restrict access to the fasteners 338 to prevent the mounting bracket 320 from being removed when the system is installed. This reduces the risk that the system and the fishing rods and reels held in the system will be stolen. As illustrated in FIG. 18, the mounting bracket 320 may also include a tie down portion 352. This allows the use and functionality of a tie down to be maintained allowing the tie down to be used for tying down cargo when the mounting bracket sub-assembly 302 is installed.

FIG. 19 illustrates a cross-sectional view of the mounting bracket sub-assembly 302 installed on the tie down bracket 316. As illustrated in FIG. 19, the spacer 326 may include one or more grooves 354 adapted to receive the tie down bracket 316 and allow the spacer 326 to align with the mounting plate 318. Additionally, one of the fasteners 338 extends through the tie down bracket 316 and the other of the fasteners 338 is located outside of the tie down bracket 316. In a similar manner as the spacer 326, the guard 328 may include one or more grooves 356. The grooves 356 may be adapted to receive the heads of the fasteners 338 and allow the guard 328 to abut at least a portion of the mounting bracket 320.

The rod holder sub-assembly 304, according to an illustrative embodiment, is described with reference to FIGS. 16, 20, and 21. In this embodiment, the rod holder sub-assembly 304 includes a cross support or cross bar 308, which is a horizontal support including rod holders, for example in the form of tubes 310, coupled along the length of the cross support 308 or between the ends of the cross support 308. The rod holder sub-assembly includes first and second rod holder brackets or acceptor plates 340 coupled to opposing ends of the cross support 308. The first and second acceptor plates 340 include apertures 342 corresponding to and adapted to receive the fasteners 322 on the mounting brackets 320. The apertures 342 may be elongated to allow for slight variations in pickup truck bed widths.

The cross support 308 may be welded to the acceptor plates 340 at an angle and/or the rod holder tubes 310 may be coupled to the cross support 308 at an angle so as to reduce the height of the rod holders for transport. This allows the truck to pull into a garage with the rods in place without damaging the rods, for example. A locking mechanism 312 including a cam lock 344 may be coupled on one or more of the first and second acceptor plates 340 of the rod holder sub-assembly and is adapted to lock the cross support 308 in place.

Figure 20:
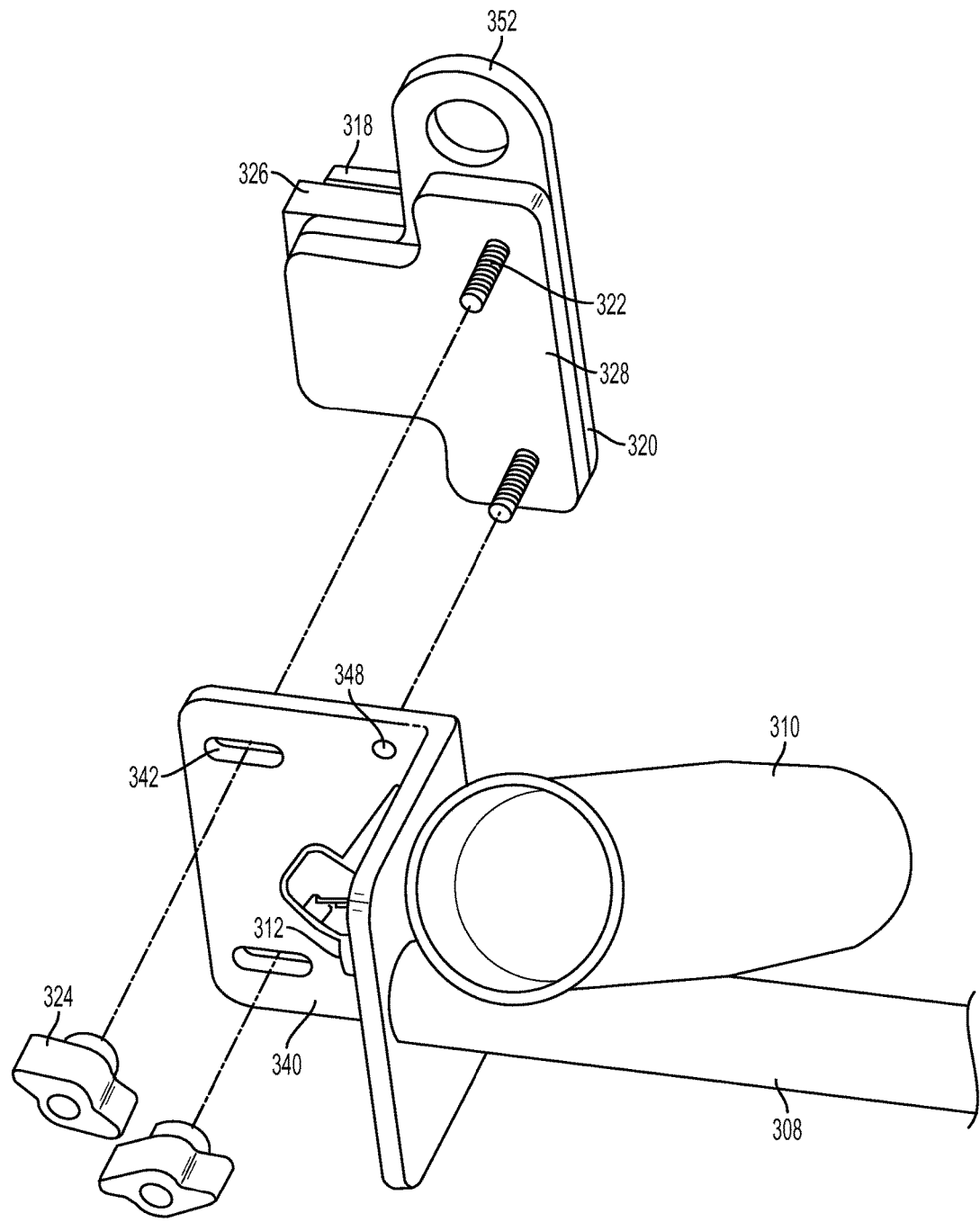
FIG. 20 illustrates a perspective view of installing a rod holder sub-assembly of the rod holder mounting system of FIG. 16 on the mounting bracket sub-assembly of FIG. 18.
Figure 21:
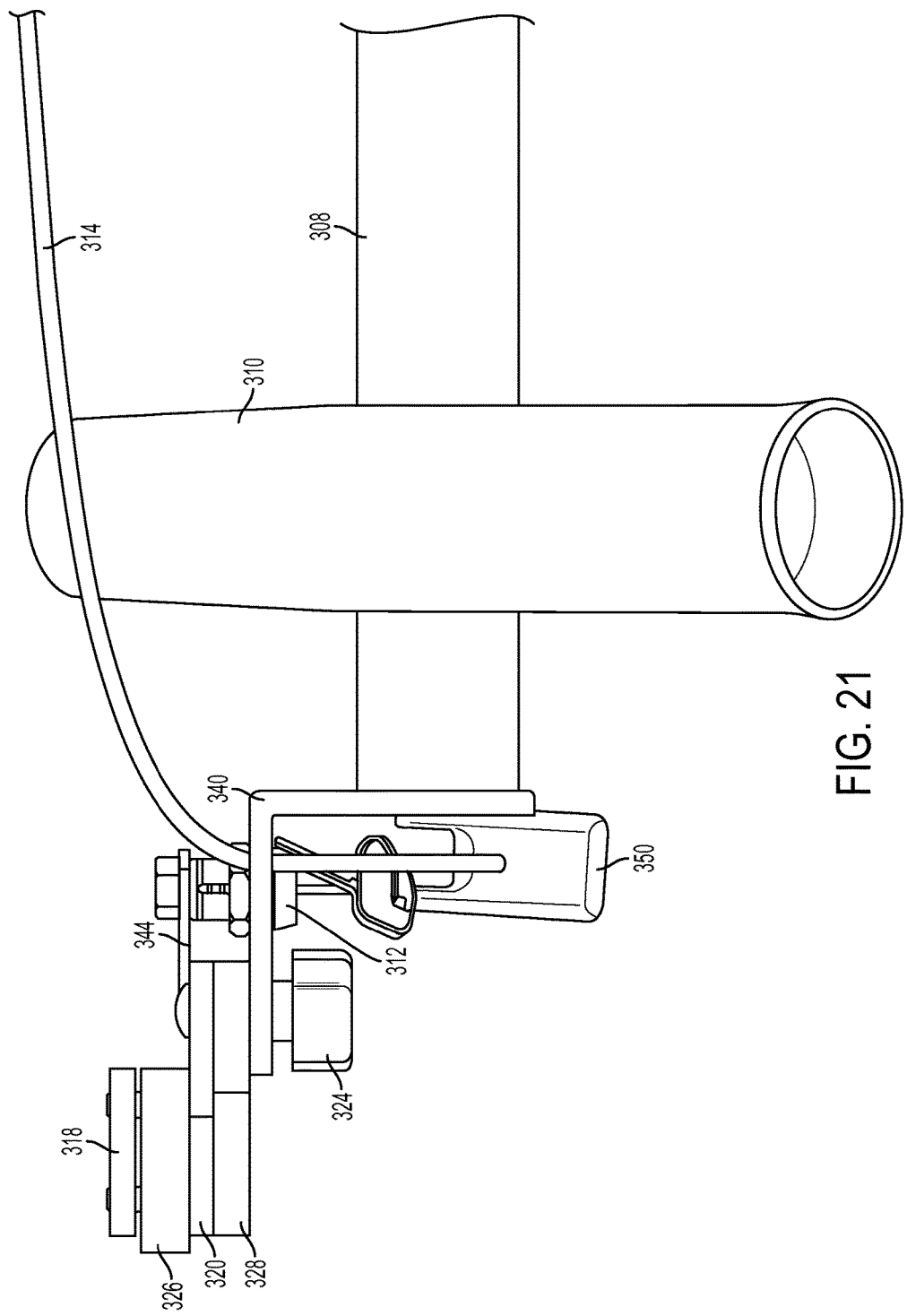
FIG. 21 illustrates a perspective view of the rod holder sub-assembly of FIG. 20 installed on the mounting bracket sub-assembly of FIG. 18.

FIGS. 20 and 21 illustrate mounting the rod holder sub-assembly 304 to the mounting bracket sub-assembly 302. As illustrated in FIG. 20, the acceptor plate 340 is coupled to the mounting bracket 320, via fasteners 322, and retaining nuts, wing nuts or thumbscrews 324 are threaded onto the fasteners 322 and adapted to hold the parts together while the cam lock 344 secures the rod holder sub-assembly 304 to the mounting bracket sub-assembly 302. The cam lock 344, when rotated to a locked position, slides behind or engages the mounting bracket 320.

Once the rod holder mounting system 300 is installed, various fishing rods and reels may be placed in the holders for transport. The holders 310 may be spaced apart to prevent the reels on adjacent fishing rods from touching. The holders 310 may also be positioned at an angle to allow for the truck to be pulled into a standard garage without the fishing rods hitting or being damaged by the door frame of the garage, for example.

As illustrated in FIGS. 20 and 21, the acceptor plates 340 may also have apertures 348 which incorporate the cable locking system 314 that can be used to run a cable lock through the fishing rods and reels to secure the fishing rods and reels to the rod holder sub-assembly 304 to reduce the risk of theft. As described above, the cable 314 runs up through a first aperture 348 in one side of the bracket or first acceptor plate 340, though apertures on the reels or coupled to the reels or rods, and then down though a second aperture 348 in the other bracket or second acceptor plate 340, as illustrated in FIG. 21. A cable lock, locking mechanism 350, is then coupled onto the cable 314 and locked in place. This effectively locks the reels to the rod holder sub-assembly 304. Additionally, the cable locking system 314 may be installed when there are no rods and reels being held in the rod holder mounting system 300. When there are no rods and reels held in the rod holder mounting system 300, the cable 314 extends through the through the first and second apertures 348 and is locked in place.

The system allows for the rod holder assembly to be easily installed and uninstalled. The system may incorporate a locking system allowing the rod holder assembly to be left in the truck at the marina or boat ramp without the worry of it being stolen. Additionally, the use and functionality of a tie down is maintained allowing the tie down to be used for tying down cargo. The rod holder mounting system 300 may also double as an out of truck rod storage assembly by connecting to a storage base, as described above with reference to FIG. 10.

Figure 22:
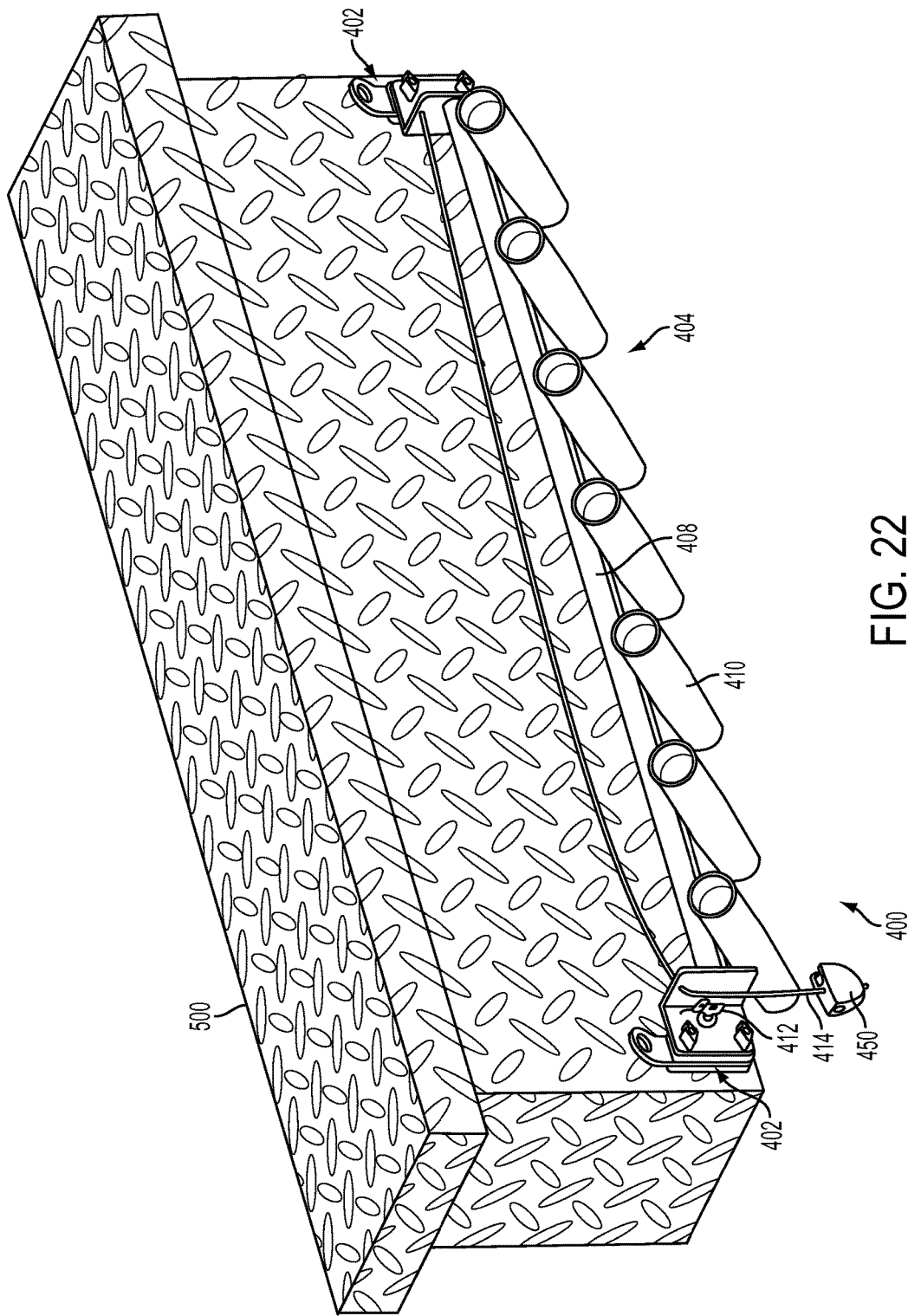
FIG. 22 illustrates a perspective view of a rod holder mounting system according to an embodiment of the present invention.

There are also some vehicles in which it may be desirable to couple a rod holder mounting system to, for example, a toolbox or other structure disposed in a vehicle. FIG. 22 illustrates another removable locking rod holder mounting system 400 adapted to couple to a toolbox in a truck bed according to an embodiment of the disclosure. In general, the rod holder mounting system 400 includes first and second mounting bracket sub-assemblies 402 adapted to couple to first and second opposing ends of a rod holder sub-assembly 404. In this embodiment, the rod holder mounting system 400 includes the first and second mounting bracket sub-assemblies 402 which respectively mount to sides of a tool box 500, and the rod holder sub-assembly 404. The rod holder sub-assembly 404 includes a cross bar 408 with rod holder tubes 410 and first and second locking systems 412 adapted to couple the cross bar 408 to the first and second mounting bracket sub-assemblies 402, respectively. The rod holder mounting system 400 may also incorporate a cable locking system 414 for reducing the risk of theft of rods and reels disposed in the rod holder tubes 410.

Figure 23:
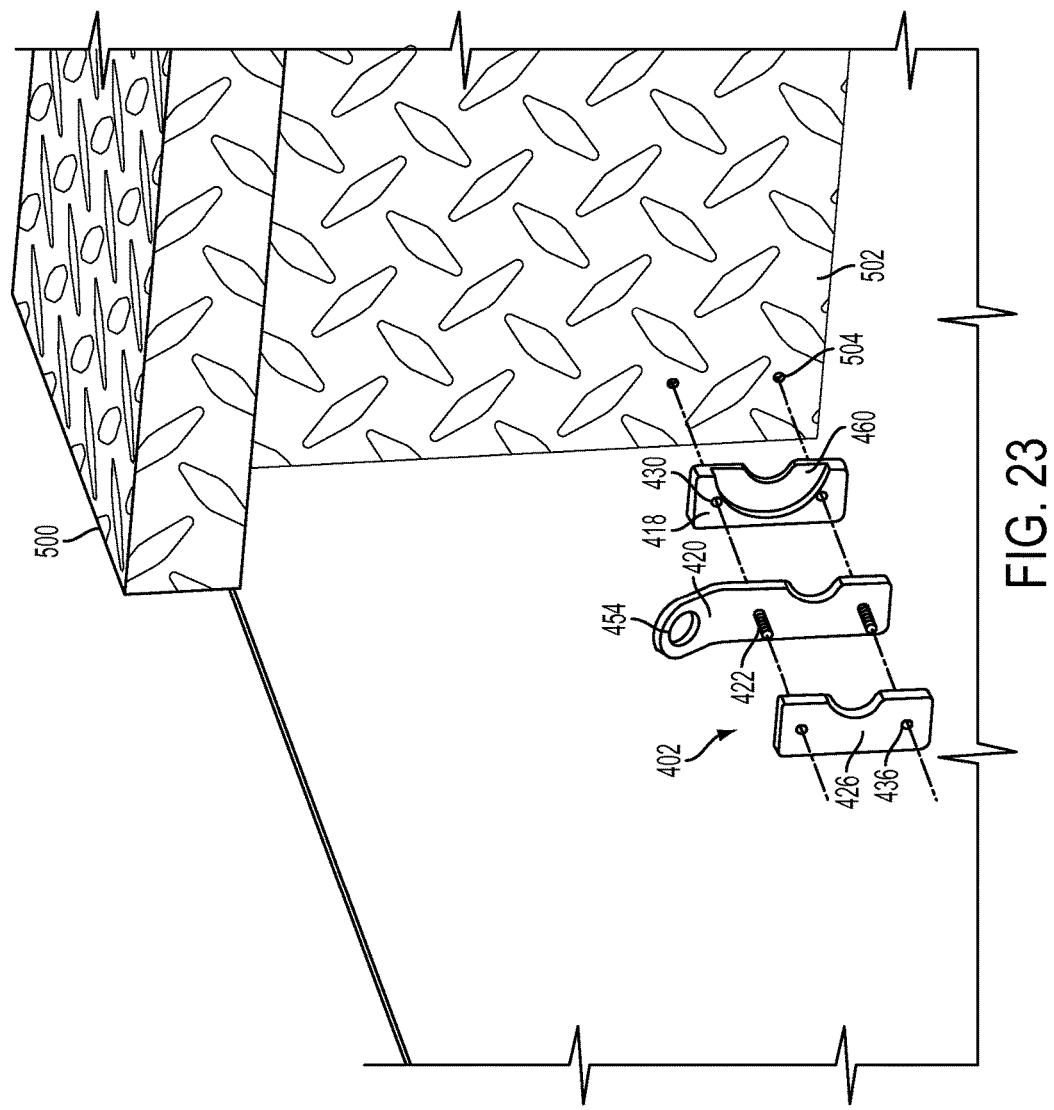
FIG. 23 illustrates an exploded perspective view of a mounting bracket sub-assembly of the rod holder mounting system of FIG. 22.
Figure 24:
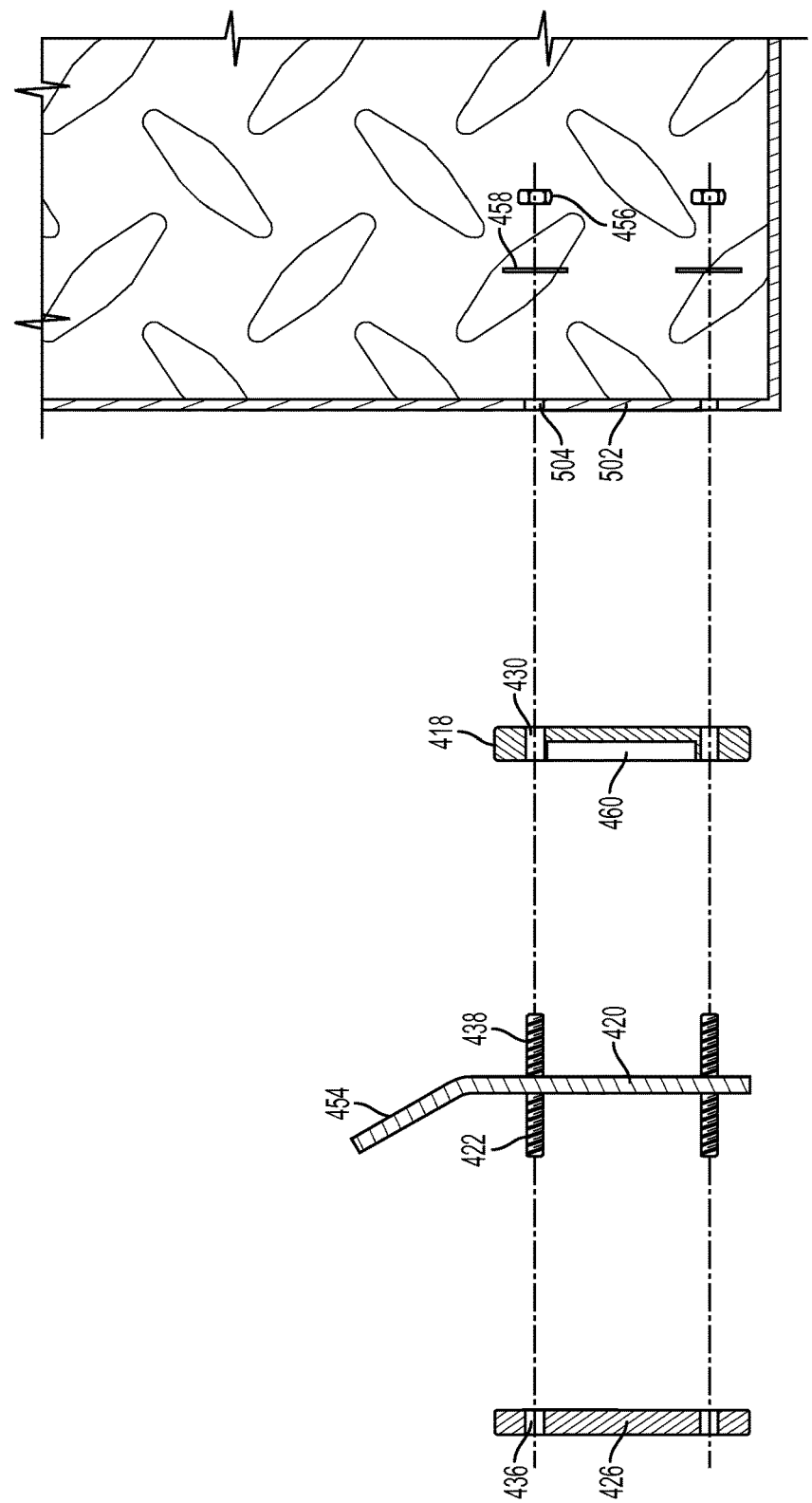
FIG. 24 illustrates an exploded cross sectional side view of the mounting bracket sub-assembly of FIG. 23.
Figure 25:
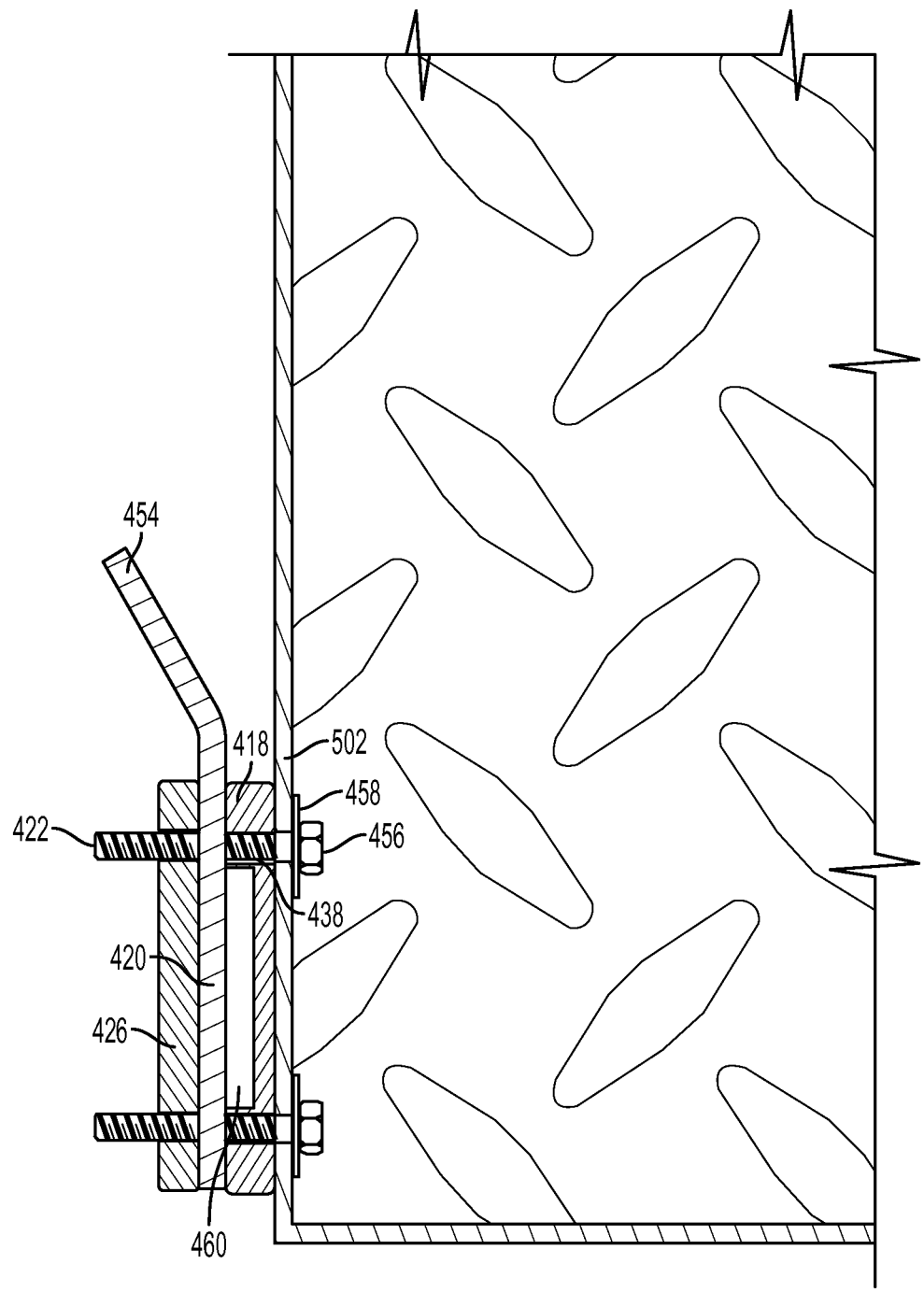
FIG. 25 illustrates a cross sectional view of the mounting bracket sub-assembly of FIGS. 23 and 24.

As illustrated in FIGS. 23-25, installing the rod holder mounting system 400 includes coupling the mounting bracket sub-assemblies 402 onto a side 502 of a tool box 500, typically found in truck beds. For the sake of brevity, the installation of the first mounting bracket sub-assembly 402 is described, and it should be appreciated that the second mounting bracket sub-assembly is substantially the same as and may be installed in substantially the same manner as the first mounting bracket sub-assembly 402.

The first mounting bracket sub-assembly 402, according to an illustrative embodiment, is described with reference to FIGS. 23-25. The first mounting bracket sub-assembly 402 may include a mounting plate 418, a mounting bracket 420 with first retaining studs or fasteners 422 extending from a first end and second retaining studs or fasteners 438 extending in an opposite direction from a second end, and a spacer 426. In this embodiment, apertures 504, adapted to receive the fasteners 438, are created in the side 502 of the toolbox 500, for example, via drilling or tapping. The mounting plate 418 includes apertures 430 adapted to receive fasteners 438, and the spacer 436 includes apertures 436 adapted to receive the fasteners 422.

The mounting plate 418 is disposed on the side 502 of the tool box 500 and apertures 430 are aligned with the apertures 504. The fasteners 438 of the mounting bracket 420 are extended through the apertures 430 and the apertures 504, and a nut 456 and optionally a washer 458 is disposed on the fasteners 438 to couple the mounting plate 418 and the mounting bracket 420 to the tool box 500.

The spacer 426 may then be disposed on the mounting bracket 420, by aligning the apertures 436 with and disposing the apertures 436 on fasteners 422. As illustrated in FIGS. 23-25, the mounting bracket 420 may also include a tie down portion 454. This allows the use and functionality of a tie down to be maintained allowing the tie down to be used for tying down cargo when the mounting bracket sub-assembly 402 is installed.

FIG. 25 illustrates a cross-sectional view of the mounting bracket sub-assembly 402 installed on the toolbox 500. As illustrated in FIGS. 23-25, the mounting plate 418 may include one or more grooves 460 adapted to receive a lock cam, as described in further detail below.

The rod holder sub-assembly 404, according to an illustrative embodiment, is described with reference to FIGS. 22, and 26-28. In this embodiment, the rod holder sub-assembly 404 includes a cross support or cross bar 408, which is a horizontal support including rod holders, for example in the form of tubes 410, coupled along the length of the cross support 408 or between the ends of the cross support 408. The rod holder sub-assembly includes first and second rod holder brackets or acceptor plates 440 coupled to opposing ends of the cross support 408. The first and second acceptor plates 440 include apertures 442 corresponding to and adapted to receive the fasteners 422 on the mounting brackets 420. The apertures 442 may be elongated to allow for slight variations in pickup truck bed and toolbox widths.

The cross support 408 may be welded to the acceptor plates 440 at an angle and/or the rod holder tubes 410 may be coupled to the cross support 408 at an angle so as to reduce the height of the rod holders for transport. This allows the truck to pull into a garage with the rods in place without damaging the rods, for example. A locking mechanism 412 including a cam lock 444 (as illustrated in FIG. 28) may be coupled on one or more of the first and second acceptor plates 440 of the rod holder sub-assembly and is adapted to lock the cross support 408 in place.

The acceptor plates 440 are coupled to the mounting brackets 420, via fasteners 422, and retaining nuts, wing nuts or thumbscrews 424 are threaded onto the fasteners 422 and adapted to hold the parts together while the cam locks 444 secure the rod holder sub-assembly 404 to the mounting bracket sub-assemblies 402. The cam locks 444, when rotated to a locked position, slide into or engage the groove 460 in the mounting plates 418.

Once the rod holder mounting system 400 is installed, various fishing rods and reels may be placed in the holders for transport. The holders 410 may be spaced apart to prevent the reels on adjacent fishing rods from touching. The holders 410 may also be positioned at an angle to allow for the truck to be pulled into a standard garage without the fishing rods hitting or being damaged by the door frame of the garage, for example.

Figure 26:
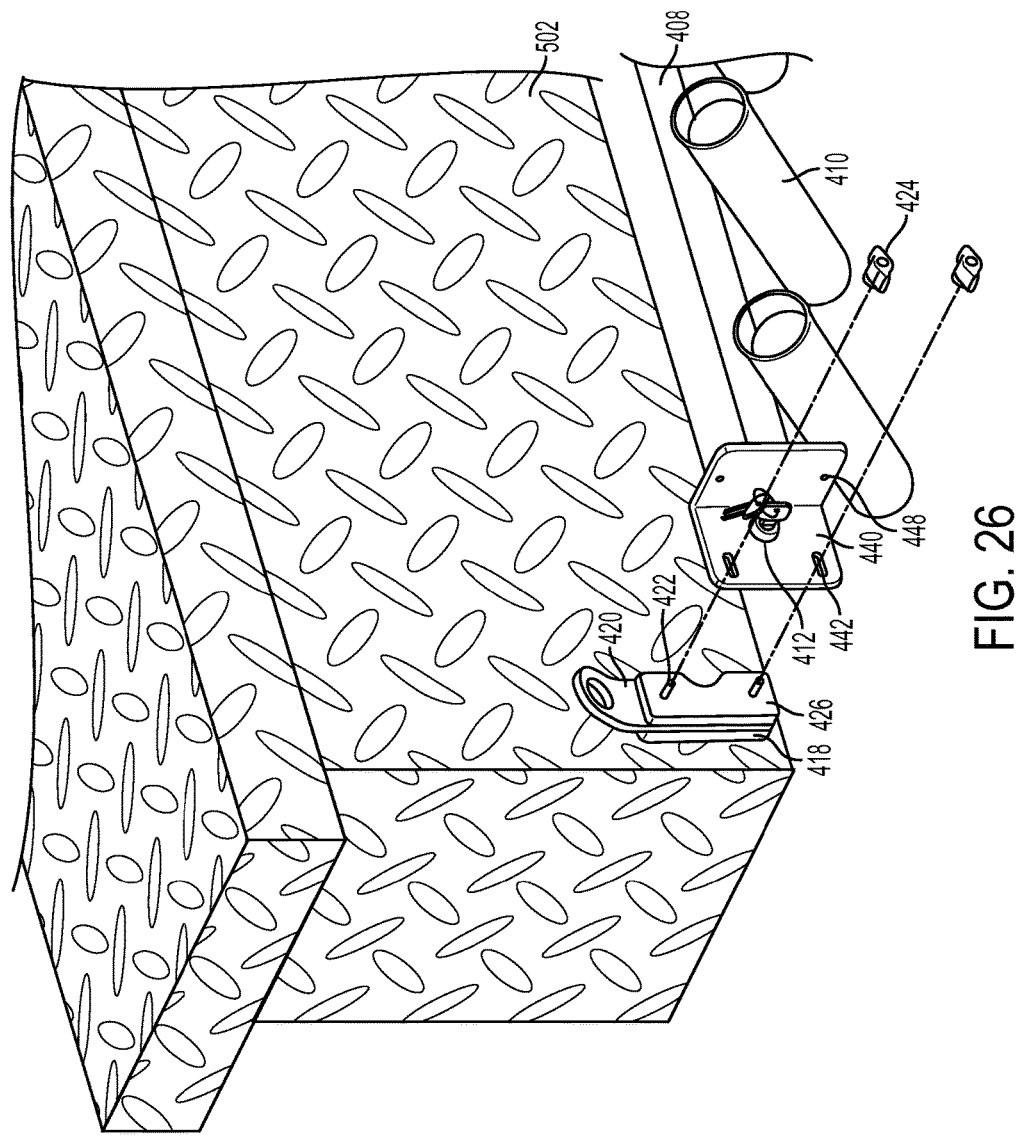
FIG. 26 illustrates a perspective view of installing a rod holder sub-assembly of the rod holder mounting system of FIG. 22 on the mounting bracket sub-assembly of FIG. 25.
Figure 27:
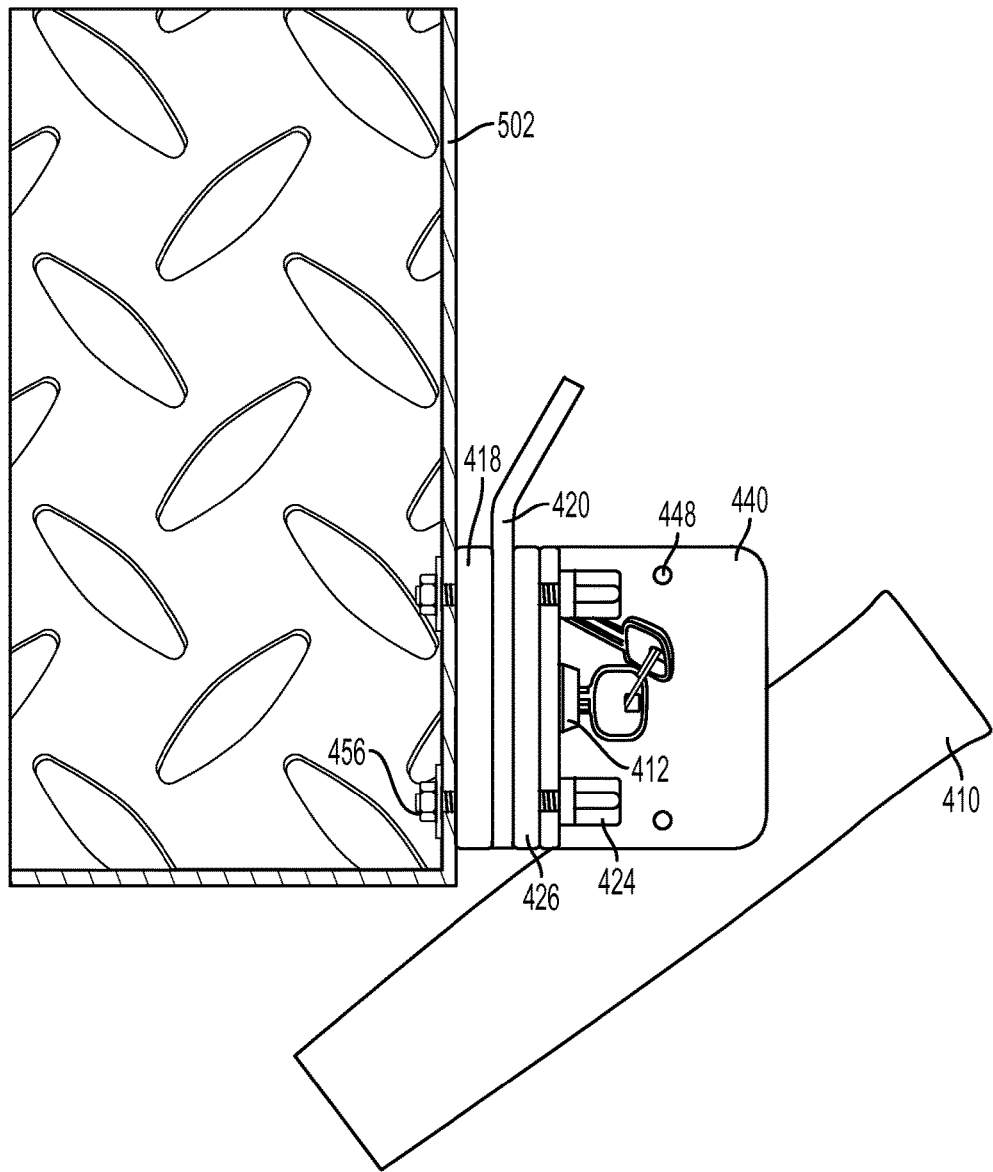
FIG. 27 illustrates a first side view of the rod holder sub-assembly of FIG. 26 installed on the mounting bracket sub-assembly of FIG. 25.

As illustrated in FIGS. 26 and 27, the acceptor plate 440 may also have apertures 448 which incorporate the cable locking system 414 (illustrated in FIG. 22) that can be used to run a cable lock through the fishing rods and reels to secure the fishing rods and reels to the rod holder sub-assembly 404 reducing the risk of theft. As described above, the cable 414 runs up through a first aperture 448 in one side of the bracket or first acceptor plate 440, though apertures on the reels or coupled to the reels or rods, and then down though a second aperture 448 in the other bracket or second acceptor plate 440, as illustrated in FIG. 22. A cable lock, locking mechanism 450, is then coupled onto the cable 414 and locked in place. This effectively locks the reels to the rod holder sub-assembly 404. Additionally, the cable locking system 414 may be installed when there are no rods and reels being held in the rod holder mounting system 400. When there are no rods and reels held in the rod holder mounting system 400, the cable 414 extends through the through the first and second apertures 448 and is locked in place.

The systems described above allow for the rod holder assemblies to be easily installed and uninstalled. The systems may incorporate a locking system adapted to lock the rod holder assembly to the toolbox in a truck bed. This allows the rod holder assembly to be left in the truck at the marina or boat ramp without the worry of it being stolen. Additionally, the use and functionality of a tie down is maintained allowing the tie down to be used for tying down cargo. The rod holder mounting systems may also double as an out of truck rod storage assembly by connecting to a storage base, as described above with reference to FIG. 10.

The systems described above hold the rods and reels at an angle when mounted in a truck so that a reasonable amount of cargo storage space is maintained in the truck bed. This maintains space for coolers and gear while holding the rods at an angle which will clear most garage door heights, for example. Further, the systems provide an optional lockable home storage base for rods and reels. With the optional storage base these systems can double as a lockable rod and real storage holder which is much more secure than other storage units.

While the systems have been described and illustrated in connection with certain embodiments, many variations and modifications will be evident to those skilled in the art and may be made without departing from the spirit and scope of the disclosure. For example, various styles of bases, wall mounts, ceiling mounts, floor mounts, truck tool boxes, and other bases and mounts may be used to install the rod holder assembly in various places, for example, garages, houses, and other areas for transport or storage. Further, by using the same brackets, cam locking, and/or cable locking systems additional transportation storage racks may be developed for items such as bicycles, scuba tanks, natural gas bottles and most anything that needs to be held in place in a vehicle, such as a pickup truck. The disclosure is thus not to be limited to the precise details of methodology or construction set forth above as such variations and modification are intended to be included within the scope of the disclosure. Moreover, unless specifically stated any use of the terms first, second, etc. do not denote any order or importance, but rather the terms first, second, etc. are merely used to distinguish one element from another.

What is claimed is:

1. A rod holder system for holding a fishing rod in a truck bed of a vehicle, wherein the truck bed has an interior and opposing first and second sidewalls respectively having first and second fastener apertures, comprising:
    a first mounting bracket having a first portion and a second portion extending from and substantially perpendicular to the first portion, the first portion is adapted to directly couple to the first fastener aperture along with an existing first tie down bracket in the truck bed that extends inwardly towards the interior of the truck bed;
    a cross support having opposing first and second ends, the first end is adapted to be removably coupled to the second portion;
    a lock mechanism having a cam and that is adapted to lock the first end of the cross support to the first mounting bracket;
    a lock guard extending from the second portion and adapted to block access to the cam; and
    a holder coupled to the cross support between the first and second ends and adapted to hold the fishing rod.

2. The system of claim 1, further comprising a cable lock extending from the first end to the second end and adapted to lock one or more fishing rods to the cross support.

3. The system of claim 1, further comprising a spacer disposed between the second portion and the first end and adapted to restrict removal of the first mounting bracket from the vehicle.

4. The system of claim 1, further comprising:
    a second mounting bracket adapted to couple to the second fastener aperture along with an existing second tie down bracket in the truck bed; and
    the second end of the cross support is adapted to be coupled to the second mounting bracket.

5. A rod holding system for holding a fishing rod in a truck bed of a vehicle, wherein the truck bed has an interior with a sidewall and a tie down bracket with opposing first and second sides and that is coupled to and extends from the sidewall towards the interior, comprising:
    a mounting bracket having a first portion and a second portion extending from and substantially perpendicular to the first portion, the first portion is adapted to be disposed on the first side of the tie down bracket;
    a cross support having opposing first and second ends, the first end is adapted to be coupled to the second portion;
    a lock mechanism having a cam and that is adapted to lock the first end of the cross support to the mounting bracket;
    a lock guard extending from the second portion and adapted to block access to the cam; and
    a holder coupled to the cross support between the first and second ends and adapted to hold the fishing rod.

6. The system of claim 5, further comprising a spacer disposed between the second portion and the first end, and on the second side of the tie down bracket.

7. The system of claim 5, further comprising a cable lock extending from the first end to the second end and adapted to lock one or more fishing rods to the cross support.

8. A rod holder system for holding a fishing rod in a truck bed of a vehicle, comprising:
    a mounting bracket having a first portion and a second portion extending from and substantially perpendicular to the first portion, the first portion is adapted to couple to a structure for tying down items coupled to the vehicle;
    a cross support having opposing first and second ends, the first end is adapted to be coupled to the first portion;
    a lock mechanism disposed in the first end of the cross support and including a lock cam rotatable between locked and unlocked positions, the lock cam is adapted to lock the first end of the cross support to the mounting bracket when in the locked position and allow the first end of the cross support to be removed from the mounting bracket when in the unlocked position;
    a lock guard extending from the second portion and adapted to block access to the lock cam; and
    a holder coupled to the cross support between the first and second ends and adapted to hold the fishing rod.

9. The system of claim 8, wherein the mounting bracket is adapted to be disposed adjacent to a side of the structure.

10. The system of claim 8, further comprising a cable lock extending from the first end to the second end and adapted to lock one or more rods and reels to the cross support.

11. A rod holder system for holding a fishing rod in a truck bed of a vehicle, wherein the truck bed has an interior and opposing first and second sidewalls, comprising:
- a first mounting bracket adapted to couple to the first sidewall;
- a second mounting bracket adapted to couple to the second sidewall opposite the first mounting bracket;
- a cross support having opposing first and second ends respectively including first and second acceptor plates, the first and second ends are adapted to be respectively removably coupled to the first and second mounting brackets;
- a first lock mechanism coupled to the first acceptor plate and including a first lock cam adapted to engage the first mounting bracket when disposed in a locked position;
- a first lock guard extending from the first mounting bracket and adapted to restrict access to the first lock cam;
- a second lock mechanism coupled to the second acceptor plate and including a second lock cam adapted to engage the second mounting bracket when disposed in the locked position;
- a second lock guard extending from the second mounting bracket and adapted to restrict access to the second lock cam;
- a rod holder coupled to the cross support between the first and second ends; and
- a cable lock adapted to lock the fishing rod disposed in the rod holder to the cross support.

* * * * *